US012759136B2

(12) United States Patent
Guishard

(10) Patent No.: US 12,759,136 B2
(45) Date of Patent: Oct. 13, 2026

(54) MODULAR BOX FOR COMPONENT MANAGEMENT IN MOBILE ROBOTS

(71) Applicant: Anram Holdings, Oakville (CA)

(72) Inventor: Everton L Guishard, Brampton (CA)

(73) Assignee: Pulse RX Disinfection Corp., Oakville (CA)

( * ) Notice: Subject to any disclaimer, the term of this patent is extended or adjusted under 35 U.S.C. 154(b) by 532 days.

(21) Appl. No.: 18/322,907

(22) Filed: May 24, 2023

(65) Prior Publication Data

US 2023/0381949 A1 Nov. 30, 2023

Related U.S. Application Data

(60) Provisional application No. 63/345,113, filed on May 24, 2022.

(51) Int. Cl.

| | |
|---|---|
| ***B25J 9/00*** | (2006.01) |
| ***B25J 5/00*** | (2006.01) |
| ***B25J 11/00*** | (2006.01) |
| ***B25J 19/00*** | (2006.01) |
| ***B25J 19/02*** | (2006.01) |

(52) U.S. Cl.

CPC ............. *B25J 9/0009* (2013.01); *B25J 5/007* (2013.01); *B25J 11/0085* (2013.01); *B25J 19/005* (2013.01); *B25J 19/02* (2013.01)

(58) Field of Classification Search

CPC ...... B25J 9/0009; B25J 5/007; B25J 11/0085; B25J 19/005; B25J 19/02; B25J 9/00; B25J 9/0003; B25J 9/0021; B62D 1/24; B32B 37/00

See application file for complete search history.

(56) References Cited

U.S. PATENT DOCUMENTS

| | | | |
|---|---|---|---|
| 8,028,659 B2 | 10/2011 | Cook et al. | |
| 10,635,758 B2 * | 4/2020 | Pivac | G06F 16/1734 |
| 2019/0079532 A1 * | 3/2019 | Crawley | B25J 11/008 |
| 2020/0347659 A1 * | 11/2020 | Rocholl | B60P 1/50 |
| 2022/0152237 A1 | 5/2022 | Barrios Sierra et al. | |

FOREIGN PATENT DOCUMENTS

| | | | | |
|---|---|---|---|---|
| CN | 107457763 A | * 12/2017 | | B25J 5/007 |
| CN | 108527311 A | * 9/2018 | | B25J 9/123 |
| CN | 109397246 A | * 3/2019 | | B25J 19/1694 |
| CN | 212022838 U | 11/2020 | | |
| CN | 113524217 A | * 10/2021 | | B25J 13/087 |
| IN | 202311036042 | 5/2023 | | |

(Continued)

OTHER PUBLICATIONS

Xu, CN-109397246-A, Machine Translation of Specification (Year: 2019).*

(Continued)

*Primary Examiner* — Jason D Shanske
*Assistant Examiner* — Matthew Joseph Ganci
(74) *Attorney, Agent, or Firm* — Rowand LLP

(57) ABSTRACT

Embodiments of the present application provide robots and a chassis for robots including a housing mounted to the chassis. The housing includes a panel configured to mount a component thereto. The panel is configured to pivot about a pivoting axis perpendicular to a horizontal axis of the housing and a vertical axis of the housing.

19 Claims, 11 Drawing Sheets

(56) References Cited

FOREIGN PATENT DOCUMENTS

| | | | | | |
|---|---|---|---|---|---|
| WO | WO-2021074327 | A1 | * | 4/2021 | ............... G01B 5/14 |
| WO | WO-2022166643 | A1 | * | 8/2022 | .............. B25J 5/007 |

OTHER PUBLICATIONS

Prat, WO-2021074327-A1, Machine Translation of Specification (Year: 2021).*
Wang, CN 113524217 A, Machine Translation of Specification (Year: 2021).*
Wang, CN-107457763-A, Machine Translation of Specification (Year: 2017).*
Su et al, CN-108527311-A, Machine Translation of Specification (Year: 2018).*
Yu, WO 2022166643 A1, Machine Translation of Specification (Year: 2022).*

* cited by examiner

MODULAR BOX FOR COMPONENT MANAGEMENT IN MOBILE ROBOTS

TECHNICAL FIELD

The present application generally relates to component management and particularly relates to a modular box for component management in mobile robots.

BACKGROUND

Various types of mobile robots (e.g., disinfection robots, delivery robots, telepresence robots, transportation robots, fire-fighting robots, autonomous robots, agricultural robots, etc.) are available in the market. These mobile robots typically have a chassis attached to a mobile platform, with a load unit secured to the chassis. The load unit generally fulfills a designated function, such as carrying or supporting parts/articles and manipulating items or surfaces. The chassis or the mobile platform often contains various operational components (e.g., motors, transformers, heat sinks, capacitors, batteries, processors, etc.) for driving the load unit or the mobile platform. These operational components are typically fixed onto the mobile platform or positioned in the lower section of the chassis. However, such static positioning of the operational components may make it difficult for a technician to access these components for maintenance and exasperate technician discomfort.

Further, the technician typically troubleshoots the robot to ensure proper functionality when its components malfunction or fail to meet the specified specifications or desired performance. If a component is faulty, the technician replaces it with a new one and troubleshoots the robot again to verify the intended operation. However, there are situations where, despite the component replacement, the robot or the newly installed component fails to adhere to the specified specifications or desired performance. In such cases, the technician must also thoroughly examine the related component assembly and various operational components connected thereto to identify the underlying cause of the robot/component malfunction. If this examination exceeds a standard duration, e.g., at a client site, the robot is often transported from the client site to a designated service center at another location for comprehensive testing. Alternatively, the technician schedules additional sessions at the client site to evaluate the robot with other related components or parts. These general actions for in-depth testing of the sub-par or faulty hardware assembly result in extended robot downtime and elevated transportation, maintenance, and operational costs.

SUMMARY

Common approaches to address the aforementioned problems involve horizontally stacking the individual operating components on top of each other or openly laying them out close to each other on a robot platform. However, the horizontal stacking of individual components can cause poor wire routing and inefficient cooling of components during operation, leading to increased power consumption, signal interference, enhanced risk of electrical hazard, and increased wear and tear of these components. Similarly, the open layout approach may result in electromagnetic interference (EMI) between the nearby operational components, causing latency, malfunction, or sluggish performance in the underlying software or hardware systems. Further, no existing solutions assist in mitigating the on-site delay in comprehensive testing of faulty hardware (or hardware assembly) while reducing robot downtime.

One embodiment of the present application includes a robot including a chassis and a housing mounted to the chassis. The housing may include a panel configured to mount a component thereto. The panel may be configured to pivot about a pivoting axis perpendicular to a horizontal axis of the housing and a vertical axis of the housing.

Another embodiment of the present application includes a chassis for a robot including a housing and a set of wheels. The housing may include a plurality of panels configured for mounting a component thereto. The plurality of panels may include a panel pivotably mounted to the housing. The panel may be configured to pivot about a pivoting axis perpendicular to a horizontal axis of the housing and a vertical axis of the housing.

The above summary of exemplary embodiments is not intended to describe each disclosed embodiment or every implementation of the present application. Other and further aspects and features of the disclosure would be evident from reading the following detailed description of the embodiments, which are intended to illustrate, not limit, the present application.

BRIEF DESCRIPTION OF THE DRAWINGS

The illustrated embodiments of the present application will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
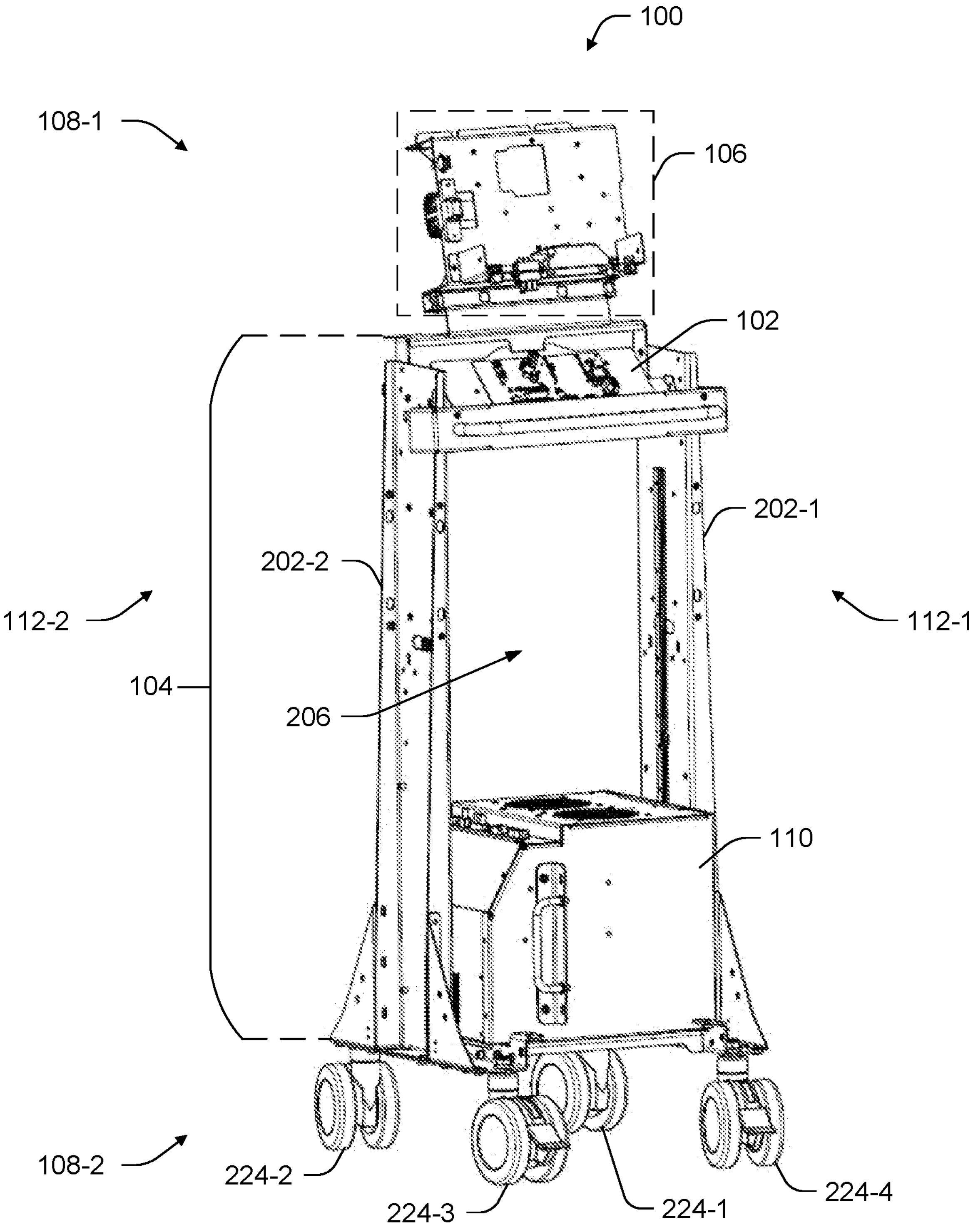
FIG. 1 is a rear oblique view of a mobile robot including an exemplary modular box, according to an embodiment of the present application.

The following detailed description is provided with reference to the drawings herein. Exemplary embodiments are provided as illustrative examples so as to enable those skilled in the art to practice the disclosure. It will be appreciated that further variations of the concepts and embodiments disclosed herein can be contemplated. The examples of the present application described herein may be used together in different combinations. In the following description, details are set forth in order to provide an understanding of the present application. It will be readily apparent, however, that the present application may be practiced without limitation to all these details. Also, throughout the present application, the terms “a” and “an” are intended to denote at least one of a particular element. The terms “a” and “an” may also denote more than one of a particular element. As used herein, the term “includes” means includes but not limited to, the term “including” means including but not limited to. The term “based on” means based at least in part on, the term “based upon” means based at least in part upon, and the term “such as” means such as but not limited to. The terms “approximately” and “about” mean a variation of +/−5% in a stated number or in an intended value of a stated parameter. Further, in the present application, an embodiment showing a singular component should not be considered limiting; rather, the present application is intended to encompass other embodiments including a plurality of the same or similar component, and vice-versa, unless explicitly stated otherwise herein. The present application also encompasses present and future known equivalents of the components referred to herein.

Further, where certain elements of the present application can be partially or fully implemented using known components, only those portions of such known components that are necessary for an understanding of the present application will be described, and detailed descriptions of other portions of such known components are omitted so as not to obscure the invention(s). In the present application, an embodiment showing a singular component should not be considered limiting; rather, the present application is intended to encompass other embodiments including a plurality of the same component, and vice-versa, unless explicitly stated otherwise herein. Moreover, the applicant does not intend for any term in the present application to be ascribed an uncommon or special meaning unless explicitly set forth as such. The present application also encompasses present and future known equivalents to the components referred to herein.

Non-Limiting Definitions

Definitions of one or more terms that will be used in this disclosure are described below without limitations. For a person skilled in the art, it is understood that the definitions are provided only for the sake of clarity and are intended to include more examples than just provided below.

A term “component” is used in the present application in the context of its broadest definition. The “component” may refer to a discrete part or element of a machine such as a robot and a vehicle. In some examples, the component may include a set of components coupled to each other.

A term “operational component” is used in the present application in the context of its broadest definition. The “operational component” may refer to an electrical or electromechanical component that supports or participates in a primary operation or a designated function of the machine.

A term “platform” is used in the present application in the context of its broadest definition. The “platform” may refer to a physical structure configured to carry or support a target object. Examples of the target object may include, but are not limited to, an article, the component, an operational component, a component assembly, and an apparatus, or any combinations thereof.

A term “chassis” is used in the present application in the context of its broadest definition. The “chassis” may refer to a structural frame configured to house, carry, or support intended target objects pertaining to the machine. In some examples, the chassis may include the platform, or vice versa.

A term “load unit” is used in the present application in the context of its broadest definition. The “load unit” may refer to the target object or a payload that the machine is configured to handle, manipulate, or transport. In some examples, the load unit may be configured to support or perform a designated function (or a primary function) of the machine. In some other examples, the load unit may be operationally coupled to one or more operational components of the machine. In a further example, the load unit may be remote from the machine.

A term “modular box” is used in the present application in the context of its broadest definition. The “modular box” may refer to a housing configured to carry, support, and/or protect a component assembly including one or more components of the machine. In some examples, the modular box, or the component assembly therein, may include the operational component of the machine. Other examples may include the modular box comprising one or more openings.

Exemplary Embodiments

Embodiments of the present application are disclosed in the context of component management and related assembly; however, one having ordinary skill in the art would understand that the concepts described herein may be implemented for various other purposes including, but are not limited to, cable management, interconnection between components, load management, mobility or portability management, and chassis management. Further, the concepts and embodiments described herein may be implemented on a robot, such as a robotic mobile platform. The robot may include one or more machines, or vice versa. The robot, in certain instances, may include one or more mobile or portable units. In further instances, the robot may operate as a vehicle, or vice versa. Other instances may include the robot or the vehicle comprising an apparatus such as a robotic arm, a portable or handheld functional unit, and a functional unit comprising an ultraviolet source.

FIG. 1 is a rear oblique view of a mobile robot 100 including an exemplary modular box 110, according to an embodiment of the present application. The mobile robot 100 may be configured to include hardware and installed software, where the hardware may be closely matched to the requirements and/or functionality of the software for enabling or performing an operation. Examples of the operation may include, but are not limited to, (i) tracking, scanning, mapping, and/or recognizing an environment or a target object, (ii) manipulating the mobile robot 100 or a target object operationally coupled thereto, (iii) communicating with a target object or a remote device operationally coupled thereto, (iv) controlling a designated function (e.g., disinfection, mapping, navigation, etc.) of the mobile robot 100 or a target object operationally coupled thereto, and (v) carrying or supporting a target object. Examples of the target object may include, but are not limited to, an article, a component, an operational component, a component assembly, and an apparatus, or any combinations thereof. The target object may be located on the mobile robot 100 or remote therefrom. The mobile robot 100, or a portion thereof, may be configured to move or remain stationary during the operation. The mobile robot 100 may represent or include any suitable types of robots known in the art, related art, or developed later including delivery robots, telepresence robots, transportation robots, fire-fighting robots, passenger robots or self-driving cars, agricultural robots, and disinfection robots.

As illustrated, the mobile robot 100 may include a controller 102, a box assembly, a chassis 104, a load unit 106, and a mobility unit. The mobile robot 100 has a first portion 108-1 and a second portion 108-2 (hereinafter collectively referred to as robot portions 108). In the illustrated example, the first portion 108-1 corresponds to an upper portion of the mobile robot 100 and the second portion 108-2 corresponds to a lower portion of the mobile robot 100; however, other examples may include the robot portions 108 corresponding to any other spatial portions of the mobile robot 100. The first portion 108-1 may include the controller 102 and the load unit 106; however, some examples may include the controller 102 or the load unit 106 mounted in the second portion 108-2 of the mobile robot 100. The controller 102 may correspond to an electrical or electronic component operating to control predefined or dynamically defined functions and movements of various components including, but not limited to, the load unit 106, the mobility unit, and any peripheral components operationally coupled to the mobile robot 100. Aspects of the controller 102, in some examples, may also include or couple to mechanical components, such as an actuator (not shown). In some instances, the controller 102 may include or be implemented by way of a single device (e.g., a computing device, a processor, or an electronic storage device) or a suitable combination of multiple devices. The controller 102 may be implemented in hardware or a suitable combination of hardware and software. The controller 102 may include, for example, microprocessors, microcomputers, microcontrollers, digital signal processors, central processing units, state machines, logic circuits, and/or any devices that may manipulate signals based on operational instructions. Among other capabilities, the controller 102 may be configured to fetch and execute computer readable instructions in communication with a storage device (not shown). The storage device may be configured to store, manage, or process data in a database related to operations of the mobile robot 100 and a log of profiles of various devices coupled to the controller 102 and associated communications including instructions, queries, data, and related metadata. The storage device may include any computer-readable medium known in the art, related art, or developed later including, but not limited to, a processor or multiple processors operatively connected, a volatile memory, a non-volatile memory, and a disk drive.

Further, the controller 102 may include or operate in communication with one or more interfaces known in the art, related art, or developed later. Examples of the interfaces may include, but are not limited to, software interfaces (e.g., application programming interfaces, a graphical user interfaces, software ports, network sockets, etc.); hardware interfaces (e.g., cables, cable connectors, plugs, hardware ports and sockets, keyboards, magnetic or barcode readers, biometric scanners, interactive display screens, cameras, etc.); or both. The interfaces may facilitate communication between various devices or components operationally coupled to the mobile robot 100. In some embodiments, the interfaces may facilitate communication with a local or remote computing device.

The mobile robot 100 may also, independently or in communication with another device, have video, voice, or data communication capabilities (e.g., unified communication capabilities). For example, the mobile robot 100, or a remote device operationally coupled thereto, may include an imaging device (e.g., camera, printer, scanner, medical imaging device/system, etc.), an audio device (e.g., microphone, audio player, audio recorder, telephone, speaker, etc.), a video device (e.g., monitor/display screen, image projector, television, video recorder, etc.), and a sensor, or any other types of hardware commensurate with predefined or dynamically defined functions or operations of the mobile robot 100, or a component thereof. Examples of the sensor may include, but are not limited to, temperature sensors, proximity sensors (e.g., inductive sensors, capacitive sensors, photoelectric sensors, ultrasonic sensors, laser sensors, radio sensors, magnetic sensors, etc.), pressure sensors, chemical sensors, gas sensors, smoke sensors, altimeters, infrared sensors, image sensors or cameras, accelerometers, gyroscopes, optical sensors (e.g., dose sensors, intensity sensors, pulse sensors, etc.), and humidity sensors. The mobile robot 100 may additionally facilitate data transfer to or from the computing device or a computer readable medium.

Figure 2:
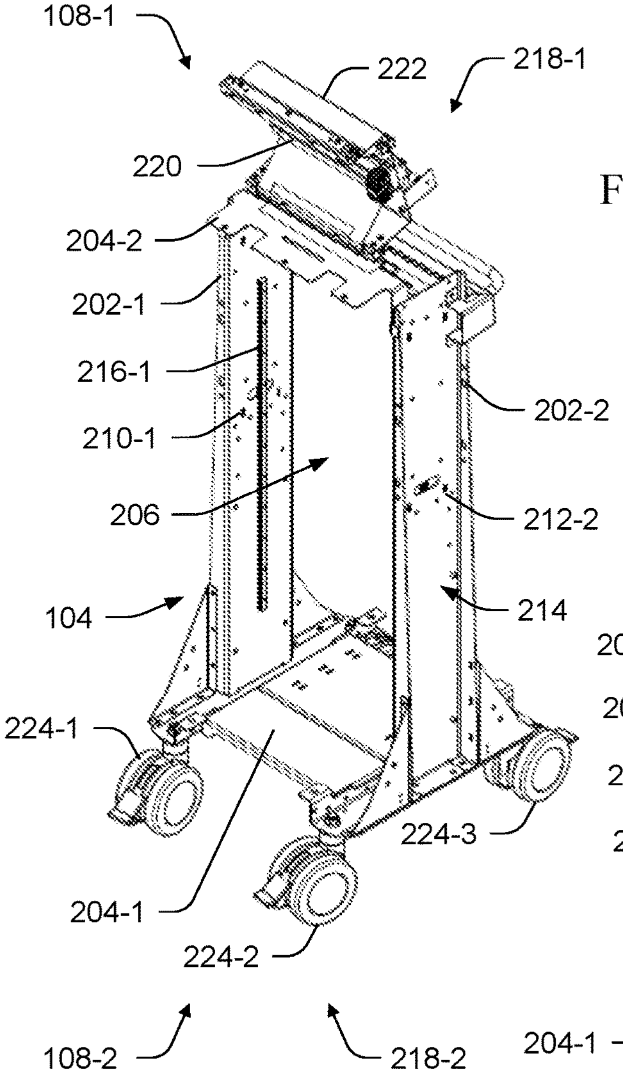
FIG. 2 is a front right perspective view of a chassis including an exemplary load unit for the mobile robot of FIG. 1, according to an embodiment of the present application.

In one embodiment, the box assembly may include a modular box 110 and a driver assembly configured for movably mounting the modular box 110 onto the chassis 104. The modular box 110 may be removably installed onto the chassis 104. As illustrated in FIG. 2, the chassis 104 may include a first column 202-1, a second column 202-2, and a set of one or more platforms. For example, the chassis 104 may include a base platform 204-1 and a top platform 204-2 (hereinafter collectively referred to as robot platforms 204). The first column 202-1 and the second column 202-2, hereinafter collectively referred to as support columns 202, may be secured to the base platform 204-1. The support columns 202 may be arranged substantially perpendicular to the base platform 204-1; however, some examples may include one or more of the support columns 202 comprising a tilted portion relative to the platforms such as the base platform 204-1. The support columns 202 may have a predefined spacing 206 therebetween. The spacing 206 may be set or adjusted based on the number and types of components mounted or proximate thereto. The first column 202-1 may be positioned opposite to the second column 202-2; however, some examples may include the first column 202-1 comprising a portion lateral to the second column 202-2. The first column 202-1 may be disposed proximate to a first lateral side 112-1 of the mobile robot 100, and the second column 202-2 may be disposed proximate to a second lateral side 112-2 of the mobile robot 100. One having ordinary skill in the art could also contemplate other suitable positions of one or more columns such as the support columns 202 relative to the box assembly based on the robot type.

Figure 3:
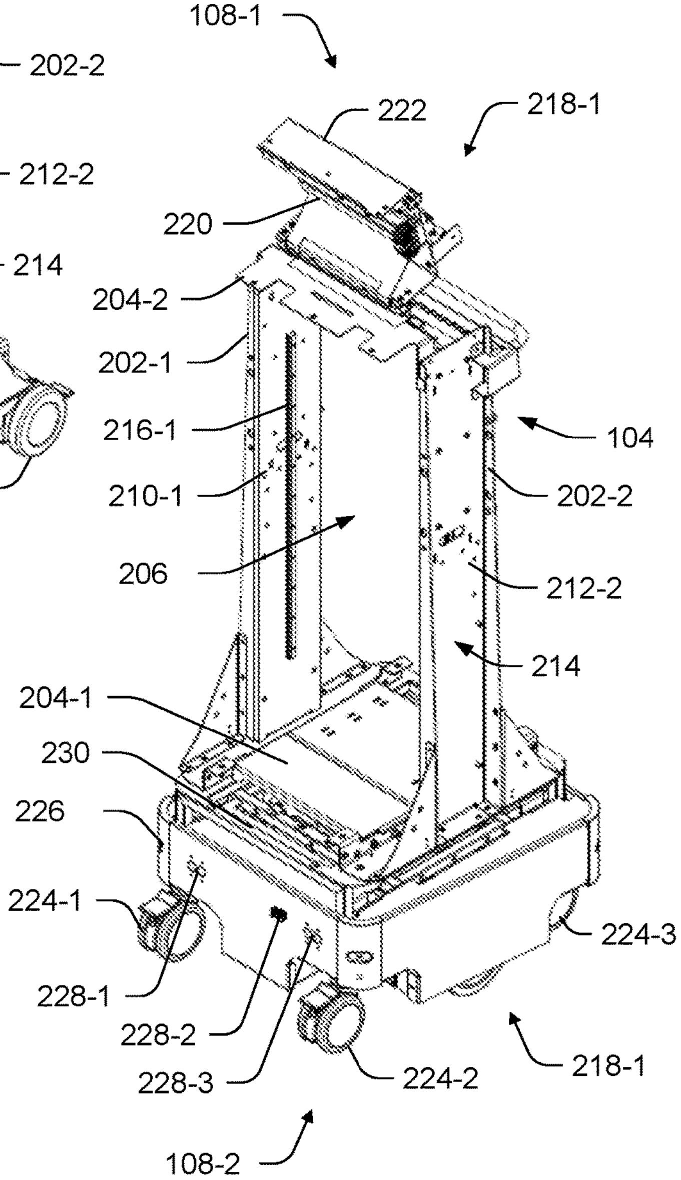
FIG. 3 is a front right perspective view of the chassis of FIG. 2 including an exemplary autonomous vehicle, according to an embodiment of the present application.

Each of the support columns 202 may include an inner surface and an outer surface. For example, the first column 202-1 may include a first interior surface 210-1 and a first exterior surface 212-1 (shown in FIG. 11). The second column 202-2 may include a second interior surface 210-2 (shown in FIG. 11) and a second exterior surface 212-2. The first interior surface 210-1 and the second interior surface 210-2 (hereinafter collectively referred to as interior surfaces 210) may be proximate or oriented towards the spacing 206 (or the base platform 204-1). Each of the first exterior surface 212-1 and the second exterior surface 212-2 (hereinafter collectively referred to as exterior surfaces 212) may face away from the spacing 206 (or the base platform 204-1). In one embodiment, the support columns 202 may include one or more channels. For example, as illustrated in FIGS. 1-3, the second column 202-2 may include a channel 214 therewith. The channel 214 may be disposed on the second exterior surface 212-2 and extend along a length of the second column 202-2. The channel 214 may be configured to receive or mount one or more side components (not shown) therewith. Examples of the side components may include, but are not limited to, the controller 102, a battery, a wire terminal, a voltage switch, circuit breakers, power ports, or any combinations thereof. The first support column 202-1 may also include another channel similar to the channel 214. The channels such as the channel 214 may assist in hazard-free wire routing and improving the placement of components relative to the box assembly for easy connection, access, and maintenance.

The support columns 202 may have similar geometries and dimensions for the ease of construction and intended stability of the chassis 104. For the sake of brevity, constructional aspects of only one of the support columns 202 are discussed here in detail; however, one having ordinary skill in the art would understand that the second column 202-2 may have similar constructional aspects including any variations commensurate with embodiments and concepts described in the present application.

In one embodiment, the chassis 104 may include the driver assembly, or parts thereof, mounted thereto. The driver assembly may be configured to move the modular box 110 relative to the chassis 104. The driver assembly may include a variety of components known in the art that can assist in movably mounting the modular box 110 onto the chassis 104. For example, the driver assembly may include a set of guide carriages and guide rails. As illustrated (FIG. 2), the first column 202-1 may include a first guide rail 216-1 secured thereto. The first guide rail 216-1 may be secured to the first interior surface 210-1 of the first column 202-1. Similarly, the second column 202-2 may include a second guide rail 216-2 (shown in FIGS. 11-12) secured thereto. The second guide rail 216-2 may be secured to the second interior surface 210-2 of the second column 202-2. The first guide rail 216-1 and the second guide rail 216-2 (hereinafter collectively referred to as guide rails 216) may extend longitudinally along a substantial length of the respective support columns 202. Each of the guide rails 216 may be configured to engage with the corresponding guide carriages 406 secured to the modular box 110, discussed below in greater detail.

Further, the chassis 104 may include an upper section 218-1 and a lower section 218-2 (hereinafter collectively referred to as chassis sections 218). As illustrated in FIGS. 1-3, the upper section 218-1 is disposed in the first portion 108-1 of the mobile robot 100 and the lower section 218-2 is disposed in the second portion 108-2 of the mobile robot 100. However, in some examples, the chassis sections 218 may be disposed in the first portion 108-1 of the mobile robot 100. Other examples may include the chassis sections 218 disposed in the second portion 108-2 of the mobile robot 100. Each of the chassis sections 218 may include one or more components. For example, as illustrated in FIGS. 2-3, the upper section 218-1 may include the top platform 204-2 and the lower section 218-2 may include the base platform 204-1. The top platform 204-2 may be spaced from the base platform 204-1. The separation between the top platform 204-2 and the base platform 204-1 may be set based on the type or number of components therebetween. In some examples, the robot platforms 204 may be located in the upper section 218-1 of the chassis 104. Other examples may include the robot platforms 204 located in the lower section 218-2 of the chassis 104.

The robot platforms 204 may be adjacent to each other. For example, the top platform 204-2 may be located over and/or opposite the base platform 204-1; however, some examples may include the top platform 204-2 being lateral to the base platform 204-1. In further examples, the top platform 204-2 may be positioned in a plane (e.g., a horizontal plane or a vertical plane) excluding the base platform 204-1. Other examples may include any of the robot platforms 204 being rotatable about a vertical axis (e.g., a central axis or a lateral axis) of the mobile robot 100, the chassis 104, or the support columns 202.

Each of the robot platforms 204 may be configured to support or carry a component (or a component assembly) of the mobile robot 100 or the chassis 104. For example, the top platform 204-2 may carry the load unit 106 mounted thereto. The load unit 106 may include a powered unit or a non-powered unit, or a combination thereof, depending on the intended operation of the mobile robot 100. In the illustrated example (FIGS. 2-3), the load unit 106 includes a germicidal assembly comprising an ultraviolet (UV) source 220 and a reflector 222. The UV source 220 may include a high voltage optical component (e.g., Xenon UV lamp, UV bulb, etc.) or a low voltage optical component (e.g., UV LED), or any combinations thereof. The UV source 220 may be a pulsed radiation source, a continuous radiation source, or a set of both the pulsed radiation source and the continuous radiation source configured to emit pulses of UV light; however, alternatively, the UV source 220 may be configured for a continuous emission of UV light.

In another example, the load unit 106 (or the germicidal assembly) may additionally, or alternatively, include different types of radiation sources (not shown) or non-radiation sources (not shown) configured for providing assistive agents to effect or facilitate disinfection. Examples of such assistive agents may include, but are not limited to, chemical agents (e.g., alcohols, oxidizing agents, naturally occurring or modified compounds, etc.), physical agents (e.g., heat, pressure, vibration, sound, radiation, plasma, electrical current, etc.), and biological agents (e.g., living micro-organisms, plants or plant products, assistive-pathogens, organic residues, etc.).

In further examples, the load unit 106 (or the germicidal assembly) may include a cabinet (not shown) and a cooling source (not shown). Examples of the cooling source may include, but are not limited to, heat-sinks, liquid cooling systems, blowers, and vacuum pumps, or any combinations thereof. The load unit 106 (or the germicidal assembly) may also include a sensor (not shown) such as those mentioned above. In some instances, the cabinet may house or support one or more of the cooling source, the reflector 222, the sensor, and a germicidal source. Examples of the germicidal source may include, but are not limited to, radiation sources such as the UV source 220 and non-radiation sources such as a set of spray nozzle and a fluid tank for storing a germicidal or cleaning fluid. The spray nozzle may be connected to the fluid tank and operated to spray the fluid onto a target surface. Other examples of the load unit 106 (or the germicidal assembly) may include, but are not limited to, a storage box or compartment, a handheld functional unit or apparatus, a portable functional unit or apparatus, a robotic arm, or any combinations thereof. In the illustrated example, the load unit 106 is mounted in the upper section 218-1 of the chassis 104 (and the first portion 108-1 of the mobile robot 100); however, some examples may include the load unit 106 or a component thereof mounted on the base platform 204-1 or the lower section 218-2 of the chassis 104 (and the mobile robot 100).

The lower section 218-2 of the chassis 104 may further include the mobility unit connected thereto. The mobility unit may assist in moving the chassis 104 (or the mobile robot 100) from one position to another. The mobility unit may be motorized or non-motorized. The mobility unit may be automated or configurable for manual operation. The mobility unit may have any suitable configuration known in the art. For example, in one embodiment (FIGS. 1-2), the mobility unit may be adapted as wheels 224-1, 224-2, 224-3, and 224-4, hereinafter collectively referred to as wheels 224. One having ordinary skill in the art would understand that any suitable types of wheels 224 known in the art, related art, or developed later may be implemented including, but not limited to, omnidirectional wheels and caster wheels. The wheels 224 may be attached to the base platform 204-1; however, some examples may include the wheels 224 being attached to the support columns 202. The wheels 224 may be motorized or non-motorized.

In another embodiment (FIG. 3), the mobility unit may be adapted as an autonomous vehicle 226 configured to navigate the chassis 104 (and the mobile robot 100) autonomously. The autonomous vehicle 226 may include a local control unit (not shown) and the wheels 224 mounted thereto. The local control unit may operate independently or in communication with the controller 102 to move the wheels 224 and the mobile robot 100. In some examples, the wheels 224 or the autonomous vehicle 226 may be controlled by a remote device operating in communication with the controller 102. The autonomous vehicle 226 may also include sensors 228-1, 228-2, and 228-3, hereinafter collectively referred to as sensors 228. One having ordinary skill in the art would understand that any suitable types of sensors 228 known in the art, related art, or developed later, including those mentioned above, may be implemented. The sensors 228 may operate in communication with the control unit and/or the controller 102. The sensors 228 may provide a signal based on detection of an object (or a target object) in a moving path of the autonomous vehicle 226, or lateral thereto. The control unit (or the controller 102) may manipulate a speed, an acceleration, or a direction of motion of the autonomous vehicle 226 (and the mobile robot 100) based on the signal. Further, in some examples, the autonomous vehicle 226, or the chassis 104, may include a turning wheel (not shown) or any other suitable turning mechanisms known in the art, related art, or developed later. The turning wheel may be positioned orthogonal to one or more of the wheels 224. The turning wheel may assist in turning or rotating the autonomous vehicle 226 about a vertical axis (e.g., a central or a lateral axis) passing therethrough. Some examples may include the turning wheel being configured to turn or rotate the autonomous vehicle 226 (or the mobile robot 100) about the vertical axis (e.g., the central axis or the lateral axis) of the mobile robot 100 or the chassis 104. The autonomous vehicle 226 may also include a support platform 230 configured to support or mount the base platform 204-1 (or the chassis 104) thereto; however, some examples may include the support platform 230 defining the base platform 204-1. The support platform 230 (or the base platform 204-1) may receive or support the modular box 110.

In one embodiment, as illustrated (FIG. 1), the base platform 204-1 may support the modular box 110 within the spacing 206 and in the lower section 218-2 of the chassis 104 (or the second portion 108-2 of the mobile robot 100); however, some examples may include the base platform 204-1 supporting the modular box 110 in the upper section 218-1 of the chassis 104 (or the first portion 108-1 of the mobile robot 100). The modular box 110 may be positioned between the robot platforms 204. The modular box 110 may be configured to carry or support a target object such as those mentioned above. In the illustrated example (FIG. 1 and FIG. 4), the modular box 110 may include a housing configured to carry, support, and/or protect a component assembly of the mobile robot 100. The component assembly may include one or more operational components of the mobile robot 100. Examples of the operational components may include, but are not limited to, motors, transformers, heat sinks, capacitors, resistors, inductors, diodes, power supply block or batteries, processors, safety relay device, inverters, circuit breakers, a transceiver circuit, and a load controller. In some examples, one or more operational components may be configured to drive remote components of the mobile robot 100. Examples of the remote components may include, but are not limited to, the controller 102, the load unit 106, the germicidal source, a battery (e.g., battery 908), an inverter, and the autonomous vehicle 226. In further examples, the modular box 110 may include a means (e.g., compartment, shelf, hook, holder, etc.) for storing or stowing portable articles. Other examples of the modular box 110 may include a recess (not shown) for removably receiving a component (e.g., UV source 220) or a portion of the load unit 106. The modular box 110 may operate as a plug-and-play unit for driving the load unit 106 or the mobile robot 100.

Figure 4:
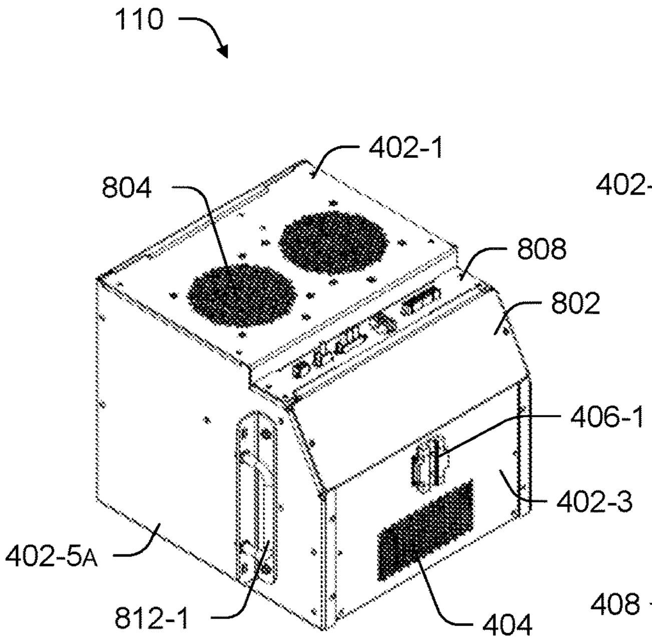
FIG. 4 is a front left perspective view of the modular box of FIG. 1 in an exemplary closed configuration, according to an embodiment of the present application.
Figure 5:
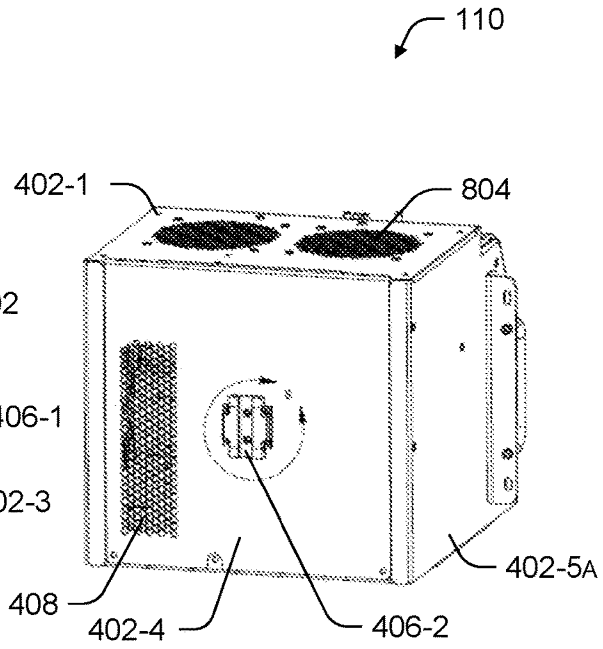
FIG. 5 is a rear oblique view of the modular box of FIG. 4, according to an embodiment of the present application.
Figure 8:
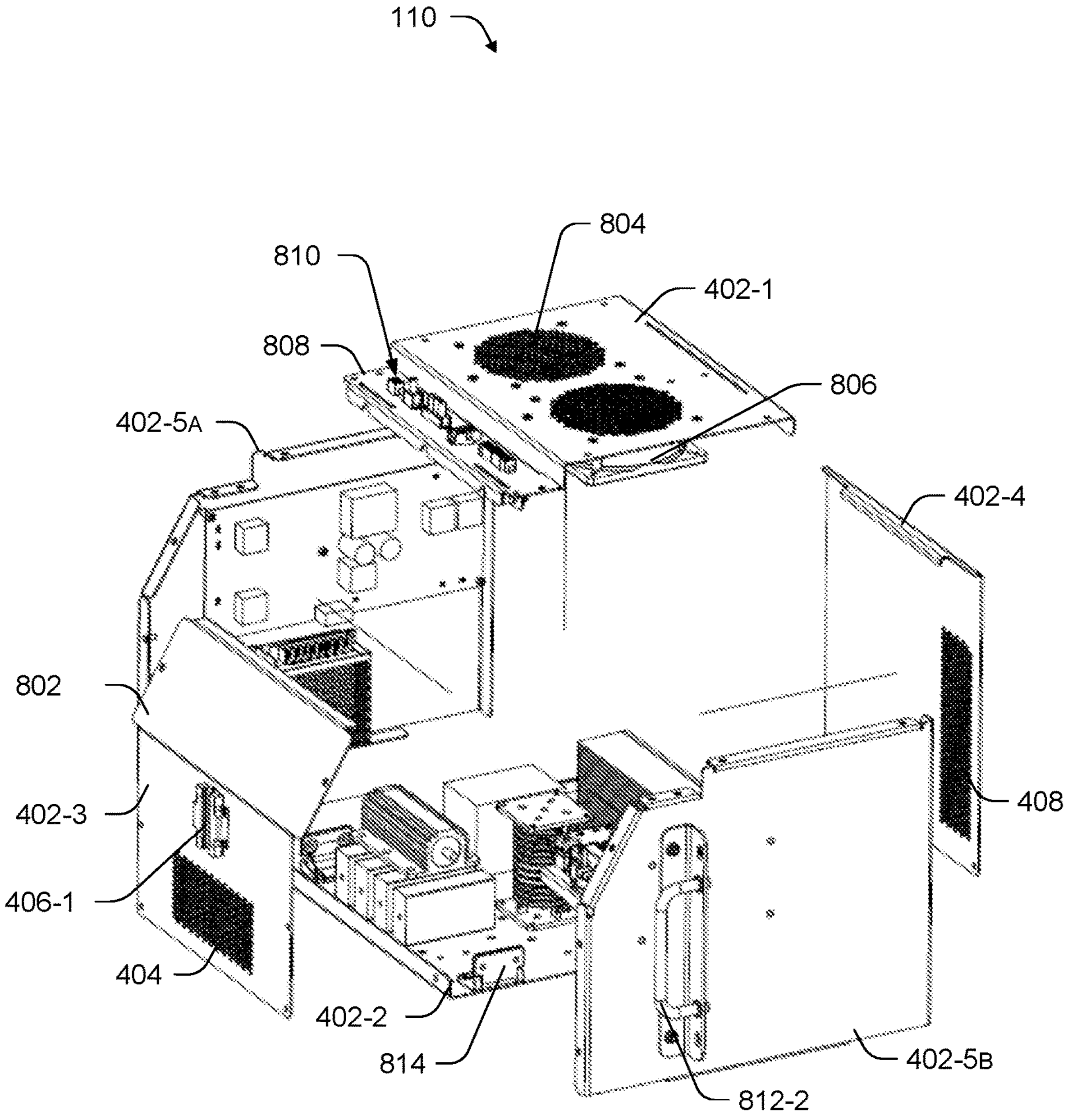
FIG. 8 is an exploded view of the modular box of FIG. 4, according to an embodiment of the present application.

As illustrated in FIG. 4, FIG. 5, and FIG. 8, the modular box 110 may include a top panel 402-1, a bottom panel 402-2, a front panel 402-3, a rear panel 402-4, a first lateral panel 402-5*a*, and a second lateral panel 402-5*b* (hereinafter collectively referred to as box panels 402). The box panels 402 may be made up of any suitable materials known in the art, related art, or developed later including, but not limited to, metals, polymers, glass, quartz, alloys, or any combinations thereof that may be sufficiently rigid and sturdy to support a component assembly including any of the operational components. In some examples, the box panels 402 may be made up of materials containing metals to assist in grounding and providing protection from the electromagnetic interference between the components within the modular box 110 during operation. In one embodiment, the modular box 110 may be configured to transition between a closed configuration and an open configuration. In the closed configuration, the modular box 110 may have a footprint or geometry smaller than that in the open configuration. In the closed configuration, as illustrated in FIG. 4, the box panels 402 may be assembled in a manner that limits or prevents access to an interior portion of the modular box 110. In one example, the interior portion may extend between the bottom panel 402-2 and the top panel 402-1 (or heights of the lateral panels 402-5) of the modular box 110. Other examples may include the interior portion extending between the lateral panels 402-5, e.g., in the closed position.

Figure 6:
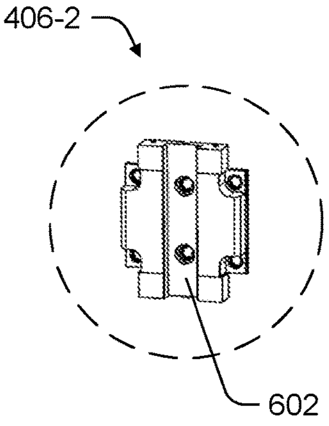
FIG. 6 illustrates an exemplary guide carriage for the modular box of FIG. 4, according to an embodiment of the present application.

Further, the modular box 110 may include front vents 404 in the front panel 402-3. The front vents 404 may allow air to pass therethrough to assist in cooling of the target objects such as operational components within the modular box 110. The front vents 404 may also allow various hazardous fluids/gases, and odours in some instances, to escape from the modular box 110, thereby improving heat dissipation and safety, reducing contamination, and maintaining electrical isolation between operational components inside the modular box 110. The front panel 402-3 may also include a front guide carriage 406-1 secured thereto. Similar to the front panel 402-3, the rear panel 402-4 includes rear vents 408 similar to the front vents 404, as illustrated in FIG. 5. The rear panel 402-4 may also include a rear guide carriage 406-2 similar to the front guide carriage 406-1. Each of the front guide carriage 406-1 and the rear guide carriage 406-2 (hereinafter collectively referred to as guide carriages 406) may be configured to engage with the guide rails 216 on the support columns 202 (or the chassis 104). For example, as illustrated in FIG. 6, the rear guide carriage 406-2 may include a slot 602 configured to fit securely on to one of the guide rails 216, such as the first guide rail 216-1, on the chassis 104. The front guide carriage 406-1 may also include another slot (not shown), similar to the slot 602, configured to fit securely on to the second guide rail 216-2 on the chassis 104. Each of the guide carriages 406 may be configured as slide guide carriages; however, other suitable types of guide carriages 406 known in the art, related art, or developed later may also be contemplated. Examples of the types of guide carriages 406 may include, but are not limited to, linear ball bearing carriages, roller bearing carriages, profiled rail carriages, and air bearing carriages. The guide carriages 406 in combination with the guide rails 216 may provide the driver assembly and assist in a linear motion of the modular box 110 within the chassis 104 (or the mobile robot 100).

Each of the guide carriages 406 may include a brake assembly mounted thereto. The brake assembly may be configured to control a movement of a guide carriage, such as the rear guide carriage 406-2, on the respective guide rail, such as the first guide rail 216-1. The brake assembly may include a manual or an automated brake. For example, as illustrated (FIG. 7), the rear guide carriage 406-2 may include a manual guide brake 702 mounted thereto; however, some examples may include the guide brake 702 either wholly or in-part mountable on or with the corresponding guide rail such as the first guide rail 216-1. The guide brake 702 may be rotatable or extendable to engage or disengage with the guide rail, e.g., the first guide rail 216-1, or a surface proximate thereto. For instance, the guide brake 702 may be rotatable about a brake axis b-b' passing therethrough. The brake axis b-b' may be perpendicular to a longitudinal axis of the first guide rail 216-1.

Figure 7:
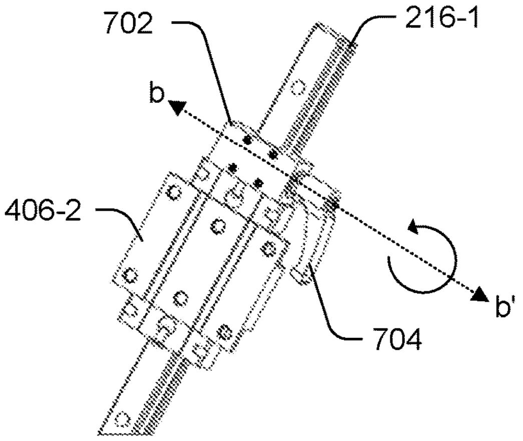
FIG. 7 illustrates an exemplary guide brake mounted on the guide carriage of FIG. 6, according to an embodiment of the present application.

The guide brake 702 may be rotated, or extended/retracted in some examples, to transition between a locked position and an unlocked position. For instance, the guide brake 702 may be rotated clockwise for being moved to the locked position. In the locked position, as illustrated in FIG. 7, the guide brake 702 may impede or stop a motion of the rear guide carriage 406-2 on the first guide rail 216-1. For example, the guide brake 702 may immovably lock the rear guide carriage 406-2 to the first guide rail 216-1 in the locked position; however, some examples may include the guide brake 702 may increase a friction coefficient of a surface between the rear guide carriage 406-2 and the first guide rail 216-1 to prevent a relative motion therebetween. Similarly, the guide brake 702 may be rotated anti-clockwise for being moved to the unlocked position (not shown). In the unlocked position, the guide brake 702 may allow a free or controlled motion of the rear guide carriage 406-2 on the first guide rail 216-1. The guide brake 702 may unlock the rear guide carriage 406-2 from the first guide rail 216-1 in the unlocked position. The rotation of the guide brake 702 may be actuated manually using a brake handle 704; however, some examples may include an actuation of the guide brake 702 being automated. For instance, the guide brake 702 may be driven by the controller 102 via an actuator (not shown). Examples of the actuator may include, but are not limited to, motors, solenoids, and hydraulic or pneumatic cylinders. The actuator may convert a control signal of the controller 102 into a mechanical force to engage or disengage the guide brake 702. Similar to the guide brake 702, the front guide carriage 406-1 may also include another guide brake mounted thereto for controlling a linear motion of the modular box 110 along the corresponding second guide rail 216-2.

The modular box 110 may include the box panels 402 removably assembled together. As illustrated in FIG. 8, the modular box 110 may be wholly or partially disassembled to access, remove, or install any of the individual box panels 402 for maintenance, replacement, or upgrade. In the modular box 110, the first lateral panel 402-5*a* and the second lateral panel 402-5*b* (collectively referred to as lateral panels 402-5) may be opposite to each other. Similarly, the front panel 402-3 may be opposite to the rear panel 402-4. In one embodiment, the lateral panels 402-5, the rear panel 402-4, and the front panel 402-3 (hereinafter collectively referred to as side panels) may be removably mounted to the bottom panel 402-2. Each of the side panels may be mounted substantially perpendicular to the bottom panel 402-2; however, some examples may include one or more of these side panels comprising a slanted portion. For example, the front panel 402-3 may include a slanted portion 802 at a set angle relative to the bottom panel 402-2. The angle may be set commensurate with (i) a casing (not shown) of the mobile robot 100 or the chassis 104 and (ii) the number and types of components supported or carried by the modular box 110. The slanted portion 802 may assist in (i) reducing the overall weight and footprint of the rear panel 402-4 (and the modular box 110), (ii) easy interconnection between the modular box 110, or ports thereof, and the remote components such as those mentioned above, and (iii) better wire/cable routing and management. Among the side panels, the front panel 402-3 and/or the rear panel 402-4 may include the top panel 402-1 mounted thereto, thereby allowing for manipulation of the lateral panels 402-5 independent of the top panel 402-1, discussed below in greater detail.

As illustrated (FIG. 8), the top panel 402-1 may include top vents 804 and a cooling unit mounted thereto. The top vents 804 may have a function similar to that of the front vents 404. The cooling unit may include one or more fans such as a fan 806; however, some examples of the top panel 402-1 may additionally include any other types of cooling unit such as those mentioned above. The fan 806 may be disposed under the top vents 804. The fan 806 may be set to have any suitable configuration. For example, the fan 806 may be configured to operate as an exhaust fan (or vacuum source) to pull and expel air out from the modular box 110 via the top vents 804, creating a negative pressure inside the modular box 110. The negative pressure may draw in fresh air from other openings such as the front vents 404 and the rear vents 408 to cool the contained target objects such as operational components and remove contaminants from the modular box 110. Other examples may include the fan 806 operating to blow fresh air into the modular box 110 for component cooling and contaminant removal. The fan 806 may create a positive airstream having a downward airflow towards the interior portion of the modular box 110. Other instances may include multiple fans include a first fan, such as the fan 806, and a second fan (not shown), where the first fan may be configured to create a positive airstream and the second fan may be configured to create a negative airstream, or vice versa, for heat and contaminant removal from the modular box 110 during operation of the mobile robot 100. In some examples, the fan 806 or any other types of cooling units may be mounted to any of the box panels 402 or distinct parts coupled therewith.

In one embodiment, as illustrated in FIG. 8, the top panel 402-1 further includes a port plate 808 mounted thereto. The port plate 808 may be configured to provide a plug-and-play functionality to the modular box 110. The port plate 808 may include any suitable types of electrical ports 810 mounted thereto. Examples of the ports 810 may include, but are not limited to, Molex™ connectors, Universal Serial Bus (USB) connectors, socket connectors, Thunderbolt™ ports, serial ports, RJ45 connectors, and DIN connectors. The ports 810 may be selected and installed based on a number and types of components requiring connection and any of the operating or safety current, voltage, and power requirements thereof. The ports 810 may interface between the modular box 110 (or components mounted therewith) and components remote therefrom, thereby providing an electrical interface for powering and/or controlling the remote components of the mobile robot 100. The ports 810 may facilitate a wired connection (e.g., via cables) or a wireless connection (e.g., via a transceiver circuit) between the modular box 110 and the remote components. The ports 810 may be positioned or extend outside the top panel 402-1 (or the modular box 110) for easy wiring and connection. In some examples, the ports 810, or the underlying port plate 808, may be mounted with any other box panels 402 of the modular box 110. For example, the port plate 808 including the ports 810 may be secured to the slanted portion 802 in the front panel 402-3. Other examples may include a display screen (not shown) secured to any of the box panels 402.

The lateral panels 402-5 may have the respective outer surfaces including one or more handles. For example, as illustrated in FIG. 4, the first lateral panel **402-5*a* may have a first outer surface including a first handle 812-1. Similarly, as illustrated in FIG. 8, the second lateral panel 402-5*b* may have a second outer surface including a second handle 812-2. Having the first handle 812-1 and the second handle 812-2 (hereinafter collectively referred to as handles 812) mounted on the opposite lateral panels 402-5 may assist in evenly distributing the box weight to assist in lifting or carrying the modular box 110. Moreover, the handles 812 may be set to orient or extend toward the same box panel, or the same plane, such as the front panel 402-3. Extending or orienting the handles 812 in the same direction provides to (i) clear a pathway between the modular box 110 and a handler for an ergonomically safe and comfortable handling, (ii) acquire a firm and simultaneous grip on both the handles 812 to reduce the chances of slipping and dropping the modular box 110, (iii) maintain stability of the modular box 110 during transportation, and (iv) facilitate an outward (or lateral) extension, or removal, of the lateral panels 402-5**.

Each of the lateral panels 402-5 may be separated by the bottom panel 402-2 therebetween. The bottom panel 402-2 may have opposite sides, each including one of the lateral panels 402-5. The bottom panel 402-2 may provide a surface for removably securing one or more operational components, such as those mentioned above, in the interior portion of the modular box 110. In one example, the bottom panel 402-2 may include high-voltage operational components mounted thereto; however, some examples of the bottom panel 402-2 may include low voltage operational components of the mobile robot 100. In one embodiment, the lateral panels 402-5 may be pivotably mounted to the bottom panel 402-2 via hinges such as a friction hinge 814; however, any other suitable connection mechanisms may also be contemplated. The lateral panels 402-5 may be configured to transition from a closed position to an open position, and vice versa. In the closed position, as illustrated in FIG. 4, the lateral panels 402-5 may be parallel to a vertical axis y-y' of the modular box 110 and the mobile robot 100, thereby facilitating to set the modular box 110 in the closed configuration.

Figure 9:
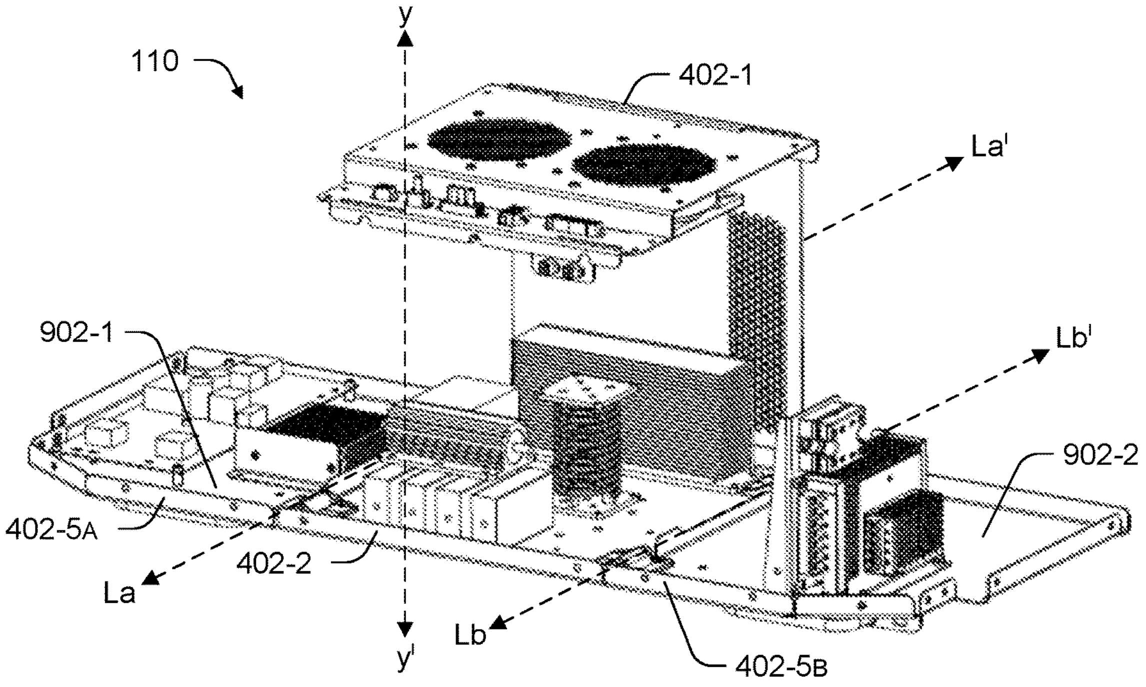
FIG. 9 is a front oblique view of the modular box of FIG. 4 (shown without a front panel) in an open configuration, according to an embodiment of the present application.

The lateral panels 402-5 may be manipulated to pivot outward or away from the top panel 402-1 for transitioning to the open position. For example, as illustrated in FIG. 9, the lateral panels 402-5 may be pulled out, e.g., using the handles 812, to pivot outward in the open position, thereby facilitating to set the modular box 110 in the open configuration. In some examples, a manipulation of the lateral panels 402-5 to transition between the closed position and the open position may be automated using any suitable mechanisms known in the art, for example, using the controller-guided motors coupled to the lateral panels 402-5. Each of the lateral panels 402-5 may pivot about a pivoting axis defined by a lateral axis (e.g., horizontal axis) of the bottom panel 402-2. For example, the first lateral panel **402-5*a* may pivot about a first lateral axis La-La' and the second lateral panel 402-5*b* may pivot about a second lateral axis Lb-Lb'. The first lateral axis La-La' may be parallel to the second lateral axis Lb-Lb'. Each of the first lateral axis La-La' and the second lateral axis Lb-Lb' (hereinafter collectively referred to as pivoting axes) may be perpendicular to the vertical axis y-y' of the modular box 110**.

Each of the lateral panels 402-5 may have an inner surface opposing the corresponding outer surface. For example, the first lateral panel 402-5*a* may have a first inner surface 902-1 opposing the first outer surface. Similarly, the second lateral panel 402-5*b* may have a second inner surface 902-2 opposing the second outer surface. Each of the first inner surface 902-1 and the second inner surface 902-2 (hereinafter collectively referred to as inner surfaces 902) may provide a surface to mount or support various components, including operational components, thereon such as those mentioned above. For instance, the first inner surface 902-1 may carry low voltage operational components and the second inner surface 902-2 may carry high voltage operational components, or vice versa. Other instances may include each of the inner surfaces 902 including a set of one or more low voltage operational components and one or more high voltage operational components. In further instances, the inner surfaces 902 may be configured to removably receive or mount a component (e.g., UV source 220, reflector 222, etc.) of the load unit 106. In some examples, the components mounted onto the inner surfaces 902 may be operationally coupled to the ports 810 (or the underlying port plate 808) on the modular box 110. Other examples may include the components mounted onto the inner surfaces 902 being configured to drive the load unit 106. Unlike traditional housings or trays providing for horizontal placement or stacking of operational components, the lateral panels 402-5 may allow for (i) the vertical positioning of the operational components in the closed position, (ii) a smaller footprint of the modular box 110 in the closed configuration, (iii) ease of access to the operational components in the open position for maintenance, inspection, access, replacement, and/or upgrade, (iv) better airflow to the interior portion for efficient cooling and contaminant removal of the operational components within the modular box 110 during operation, and (v) deployment of an intended component beyond exterior planes of the mobile robot 100 (or the chassis 104).

In the closed position, the inner surfaces 902 (or the respective lateral panels 402-5) may be parallel to each other and perpendicular to a horizontal axis x-x' of the modular box 110. In some examples, the closed configuration of the modular box 110 may include at least the lateral panels 402-5 in the closed position. However, other examples of the closed configuration may include at least one of the side panels (including an intended component configured for a designated function/operation of the mobile robot 100) in the closed position. In further examples, the closed configuration of the modular box 110 may include the side panels located within exterior planes of the mobile robot 100 (or the chassis 104). In one example, an exterior plane of the mobile robot 100 may correspond to a vertical plane comprising an exterior surface of the mobile robot 100. The lateral panels 402-5 may be removably secured in contact with the top panel 402-1 alone or in combination with one of the front panel 402-3 and the rear panel 402-4 in the closed position using any suitable securing mechanisms known in the art, related art, or developed later including, but not limited to, magnetic lock, sliding lock, screw lock, and luer lock. Since the top panel 402-1 is mounted to the rear panel 402-4 and/or the front panel 402-3, manipulating the lateral panels 402-5 from the closed position to the open position does not need or cause the top panel 402-1 to be removed. Such independent manipulation of the lateral panels 402-5 allows for efficient component maintenance and deployment without requiring the top panel 402-1 to be removed from the modular box 110 (and the mobile robot 100).

Figure 10:
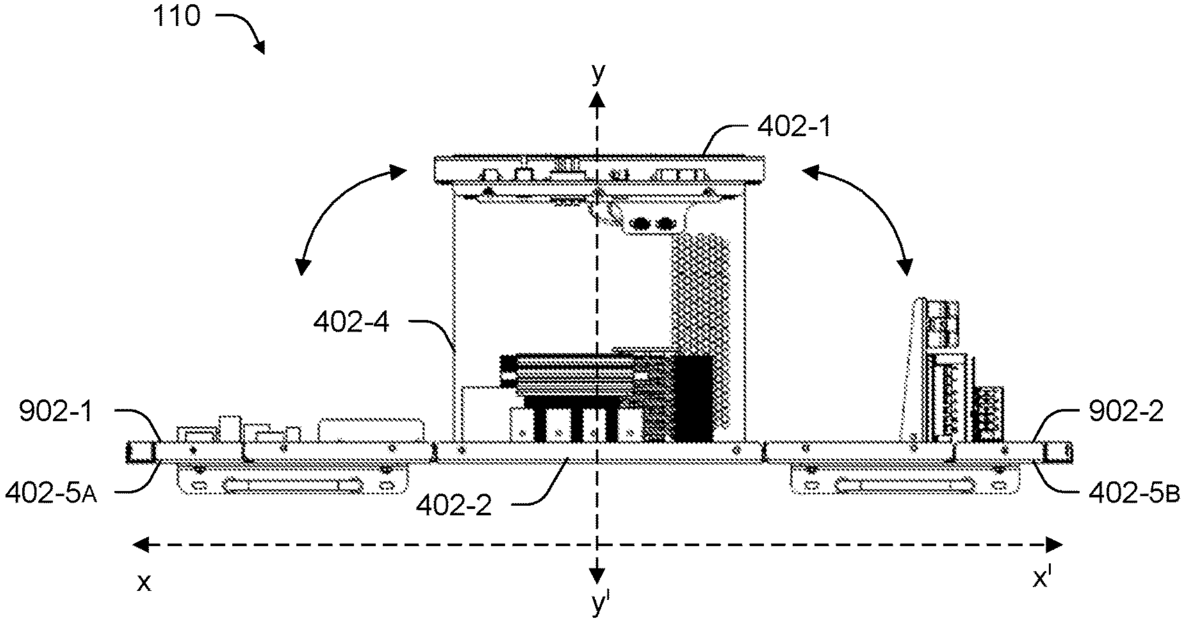
FIG. 10 is a front elevation view of the modular box of FIG. 9, according to an embodiment of the present application.

In the open position, the lateral panels 402-5 may be configured to extend up to a maximum pivot angle relative to the vertical axis y-y' of the modular box 110. For example, as illustrated in FIG. 10, the maximum pivot angle may be approximately 90 degrees; however, other examples may include the maximum pivot angle being less than approximately 90 degrees or greater than approximately 90 degrees. Further examples may include the lateral panels 402-5 being parallel to the horizontal axis x-x' of the modular box 110 in the open position, where the horizontal axis x-x' may be perpendicular to (i) the pivoting axes of the lateral panels 402-5 and/or (ii) the vertical axis y-y' (e.g., a central axis or a lateral axis) of the modular box 110. In some examples, the open configuration of the modular box 110 may include at least one of the lateral panels 402-5 in the open position. However, other examples of the open configuration may include at least one of the side panels (including an intended component configured for a designated function/operation of the mobile robot 100) in the open position. In further examples, the open configuration of the modular box 110 may include at least one of the side panels extending out of the exterior planes of the mobile robot 100.

Figure 11:
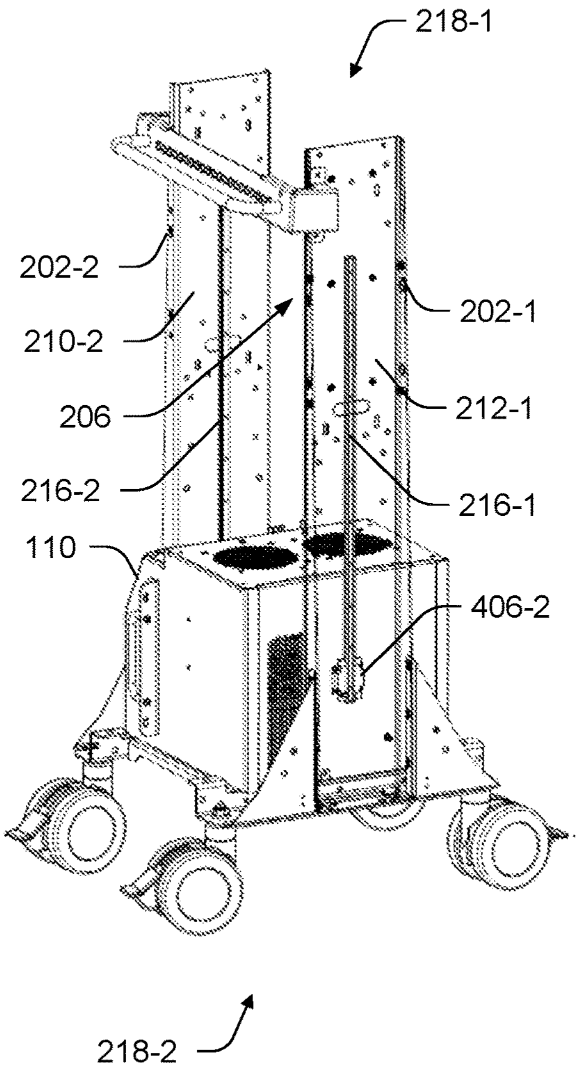
FIG. 11 illustrates the modular box of FIG. 1 including a rear guide carriage engaged with a first guide rail of the chassis of FIG. 2, according to an embodiment of the present application.
Figure 12:
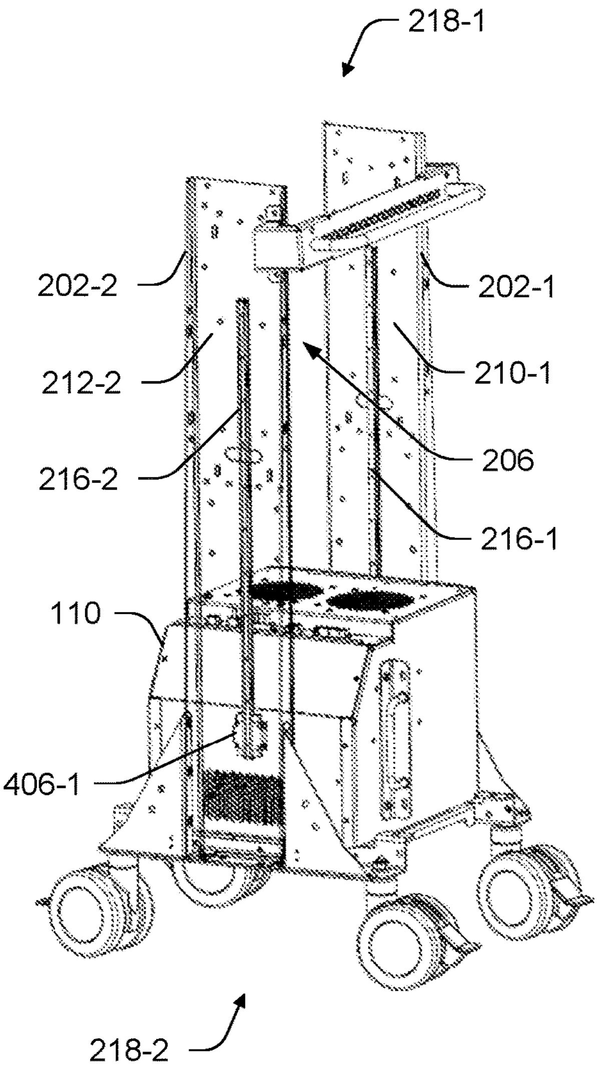
FIG. 12 illustrates the modular box of FIG. 1 including a front guide carriage engaged with a second guide rail of the chassis of FIG. 2, according to an embodiment of the present application.

The modular box 110 may be installed on the chassis 104 within exterior planes of the chassis 104, where the exterior planes may correspond to vertical planes comprising exterior surfaces of the chassis 104. For example, as illustrated in FIG. 11, the modular box 110 may be installed (in the closed configuration) within the spacing 206 and between the robot platforms 204. During installation, the rear guide carriage 406-2 of the modular box 110 may be engaged with the first guide rail 216-1 of the chassis 104. In addition to the rear guide carriage 406-2, the front guide carriage 406-1 of the modular box 110 may be engaged with the second guide rail 216-2 of the chassis 104, as shown in FIG. 12. Only for the sake of illustrating the positioning of guide rails 216, the first support column 202-1 in FIG. 11 and the second support column 202-2 in FIG. 12 are shown as transparent; however, one having ordinary skill in the art would understand that these support columns 202 are generally made of materials including metals and would be opaque in the illustrated embodiments; however, other suitable materials known in the art, related art, or developed later that are transparent or translucent may also be contemplated for other embodiments. In the illustrated example, the modular box 110 may be installed in the lower section 218-2 of the chassis 104 (or second portion 108-2 of the mobile robot 100) to assist in moving the center of mass (COM) or the center of gravity (COG) of the chassis 104 (or the mobile robot 100) downwards, for e.g., towards the ground. The downward shift of COM may counterbalance a change in the robot's center of mass during movement to provide navigational stability and prevent the mobile robot 100 from tipping over or going off-track. The modular box 110 may be removably secured to the base platform 204-1 within the chassis 104; however, some examples may include the modular box 110 formed integral to the base platform 204-1. For instance, the base platform 204-1 may include the bottom panel 402-2 of the modular box 110 integrated therewith. Other instances may include the modular box 110 being removably secured to the support platform 230 of the autonomous vehicle 226.

Figure 13:
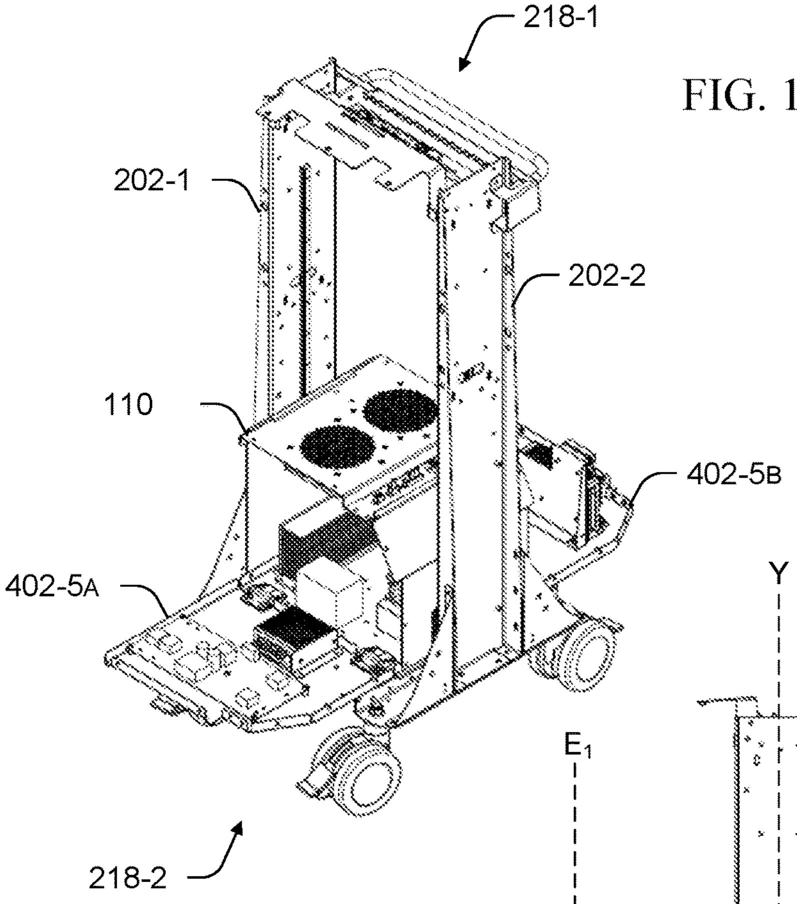
FIG. 13 is a front right perspective view of the mobile robot of FIG. 1 (shown without the load unit) including the modular box in an exemplary open configuration, according to an embodiment of the present application.
Figure 14:
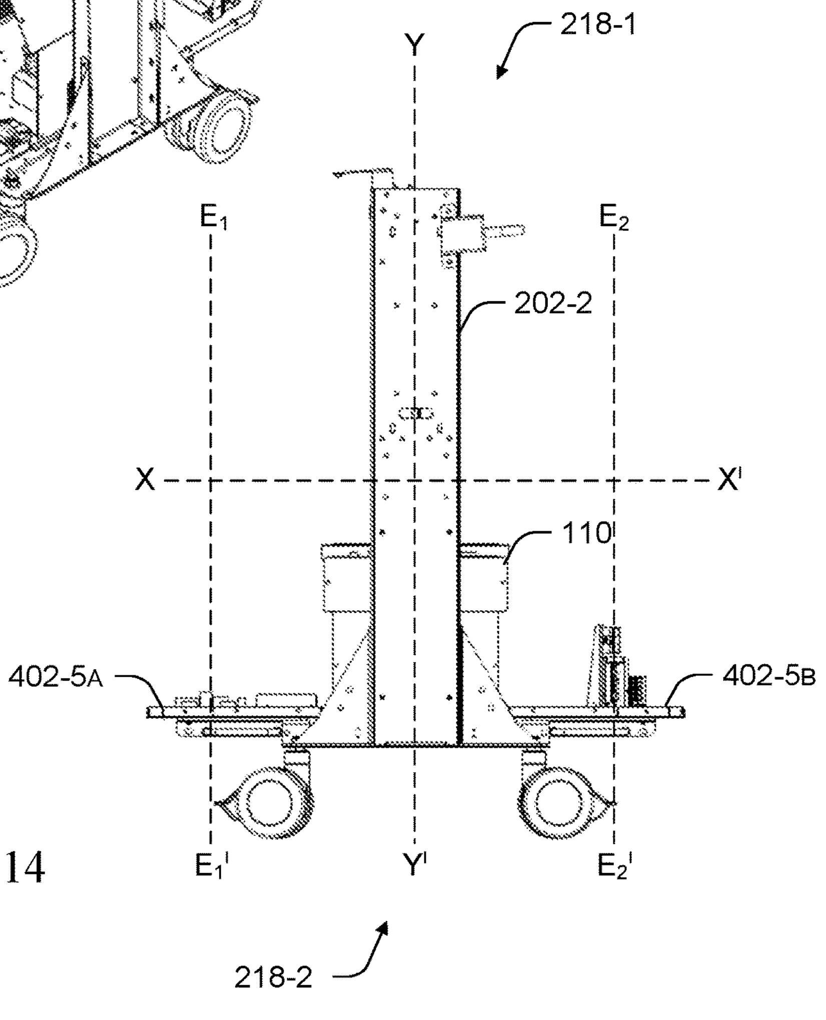
FIG. 14 is a right elevation view of the mobile robot of FIG. 13, according to an embodiment of the present application.

The modular box 110 may be manipulated to transition from the closed configuration to the open configuration, and vice versa. For example, as illustrated in FIG. 13, the lateral panels 402-5 may be operated to pivot and extend outward from opposite sides of the mobile robot 100 to transition the modular box 110 from the closed configuration to the open configuration. As illustrated in FIG. 14, in the open configuration of the modular box 110, the lateral panels 402-5 may transition from being non-parallel (in the closed position) to become parallel (in the open position) to the base platform 204-1 and a horizontal axis X-X' of the chassis 104 (and the mobile robot 100). For example, the lateral panels 402-5*a*, 402-5*b* may be operated to pivot and extend out laterally beyond the exterior planes $E_1$-$E_1$' and $E_2$-$E_2$' of the mobile robot 100 respectively, to assist in accessing or deploying target objects such as the operational components. Similarly, the lateral panels 402-5 may be retracted to transition from being non-perpendicular to the base platform 204-1 (in the open position) to being perpendicular (in the closed position) to the base platform 204-1 and the horizontal axis X-X' of the chassis 104 (or the mobile robot 100).

Figure 15:
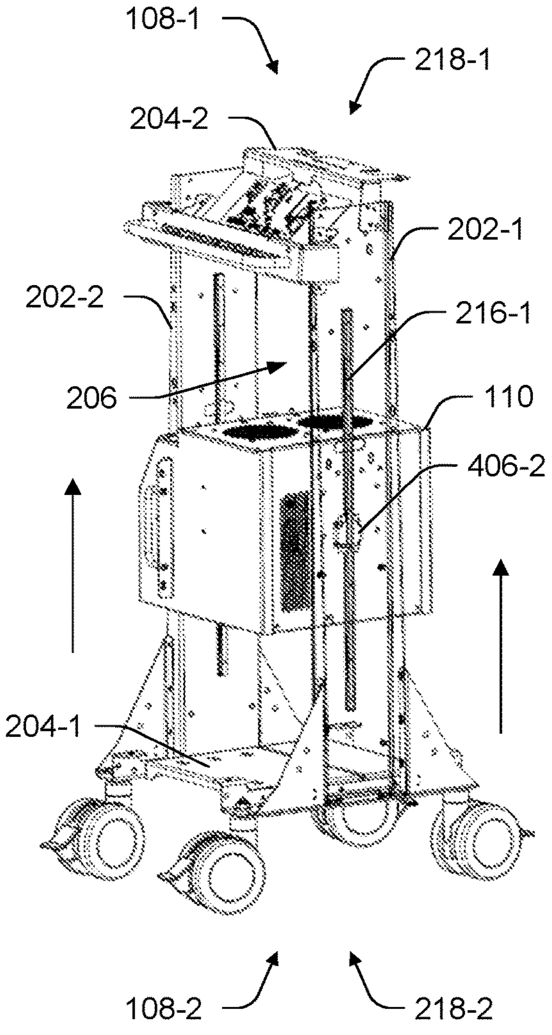
FIG. 15 illustrates the mobile robot of FIG. 1 (shown without the load unit) including the modular box being moved along the chassis of FIG. 2, according to an embodiment of the present application.
Figure 16:
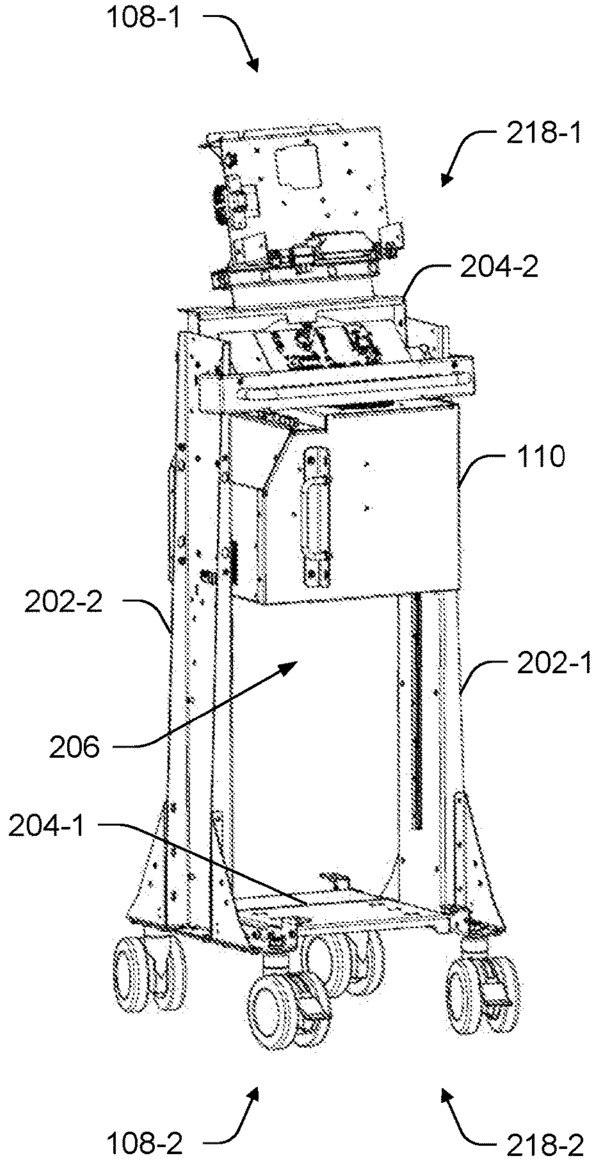
FIG. 16 is the mobile robot of FIG. 1 including the modular box of FIG. 4 mounted in an upper section of the chassis of FIG. 2, according to an embodiment of the present application.

In one embodiment, the modular box 110 may be configured to move linearly within and along a longitudinal axis of the chassis 104. For example, the modular box 110 may be configured to move back-and-forth between the base platform 204-1 and the top platform 204-2 (or between the robot portions 108) via the driver assembly. As illustrated in FIG. 15, the modular box 110 may be moved from the lower section 218-2 to the upper section 218-1 of the chassis 104 by sliding the guide carriages 406 (attached to the modular box 110) along the respective guide rails 216 on the chassis 104. As illustrated in FIG. 16, the modular box 110 may be moved into the upper section 218-1 of the chassis 104 or the first portion 108-1 of the mobile robot 100. The modular box 110 may be moved in the closed configuration towards the upper section 218-1 (or the first portion 108-1); however, some examples may include the modular box 110 being moved in the open configuration.

The modular box 110 may be moved between the robot platforms 204 when the mobile robot 100 may be stationary to avoid a risk of the mobile robot 100 being toppled over due to an upward shift in the center of gravity of the mobile robot 100. The modular box 110 may be held in an elevated position within the upper section 218-1 (or the first portion 108-1) by moving a guide brake, such as the guide brake 702, to the locked position; however, other suitable locking mechanisms known in the art may also be contemplated.

Figure 17:
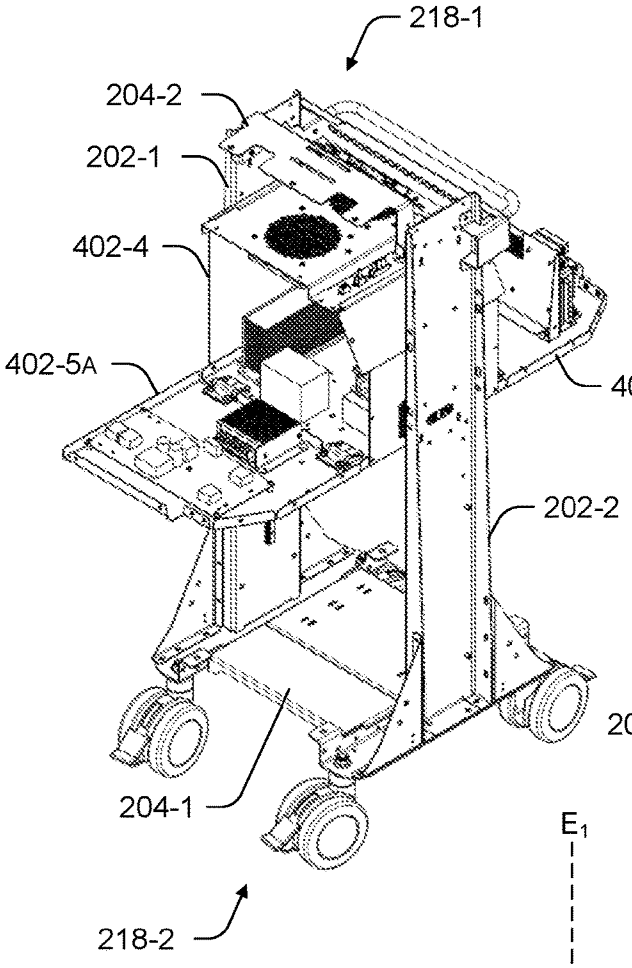
FIG. 17 is a front right perspective view of the mobile robot of FIG. 16 (shown without the load unit) including the modular box of FIG. 4 in an exemplary open configuration, according to an embodiment of the present application.
Figure 18:
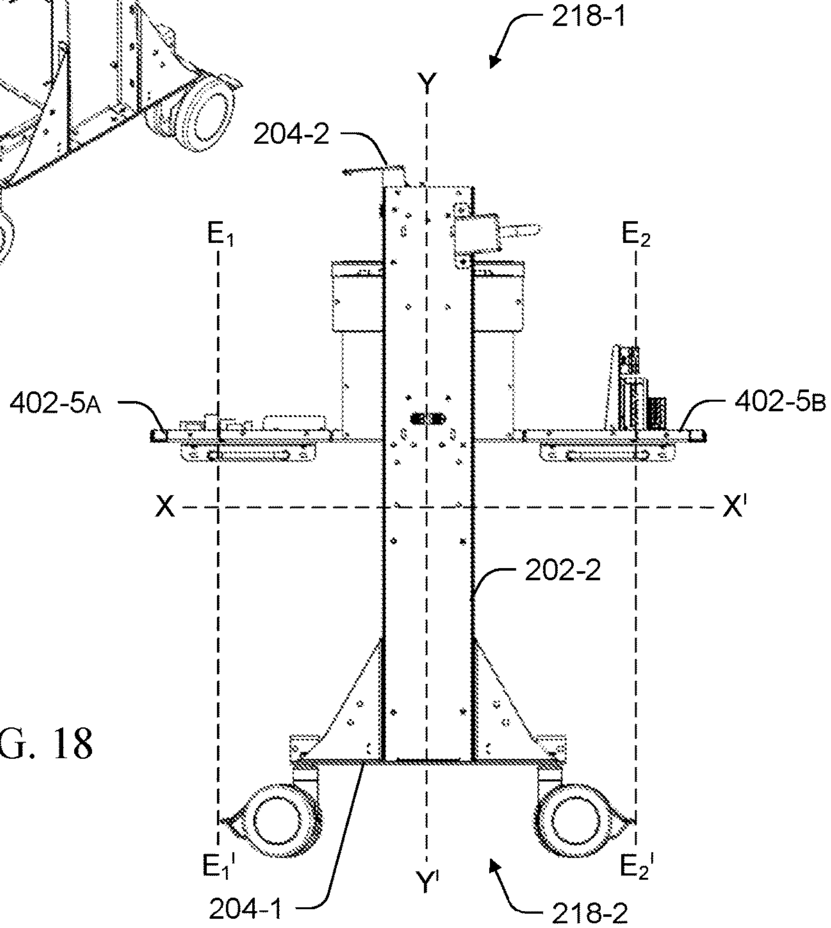
FIG. 18 is a right elevation view of the mobile robot of FIG. 17, according to an embodiment of the present application.

In the elevated position, the modular box 110 may be transformed from the closed configuration to the open configuration. For example, as illustrated in FIG. 17, in the open configuration, the lateral panels 402-5 may be switched from the closed position to the open position in the upper section 218-1 of the chassis 104. As illustrated in FIG. 18, in the open position, the lateral panels 402-5 may transition from being non-parallel to becoming parallel to the base platform 204-1 and the horizontal axis X-X' of the chassis 104 (and the mobile robot 100). For example, the lateral panels 402-5 may be operated to pivot and extend out laterally beyond the exterior planes $E_1$-$E_1$' and $E_2$-$E_2$' of the mobile robot 100 to assist in accessing or deploying target objects such as the operational components mounted to the interior portion of the modular box 110 and/or the inner surfaces 902 of the lateral panels 402-5.

Similarly, the lateral panels 402-5 may be retracted to transition from being non-parallel (in the open position) to becoming parallel (in the closed position) to a vertical axis Y-Y' of the chassis 104 (or the mobile robot 100). Hence, the modular box 110 in the open configuration may allow for easy access to, or deployment of, the operational components without requiring the technician to bend over, thereby assisting in faster or timely completion of robot maintenance or operation. Moreover, the existing modular box 110 may be replaced with a new similar modular box for quick deployment by leveraging the plug-and-play functionality thereof to significantly reduce the robot downtime. Further, in some scenarios, only an individual box panel (e.g., any of the lateral panels 402-5 and the bottom panel 402-2) including a faulty component may be replaced with the corresponding new box panel, instead of replacing the whole modular box 110, to significantly reduce the robot downtime and diminish the related transportation, maintenance, and operational costs.

Figure 19:
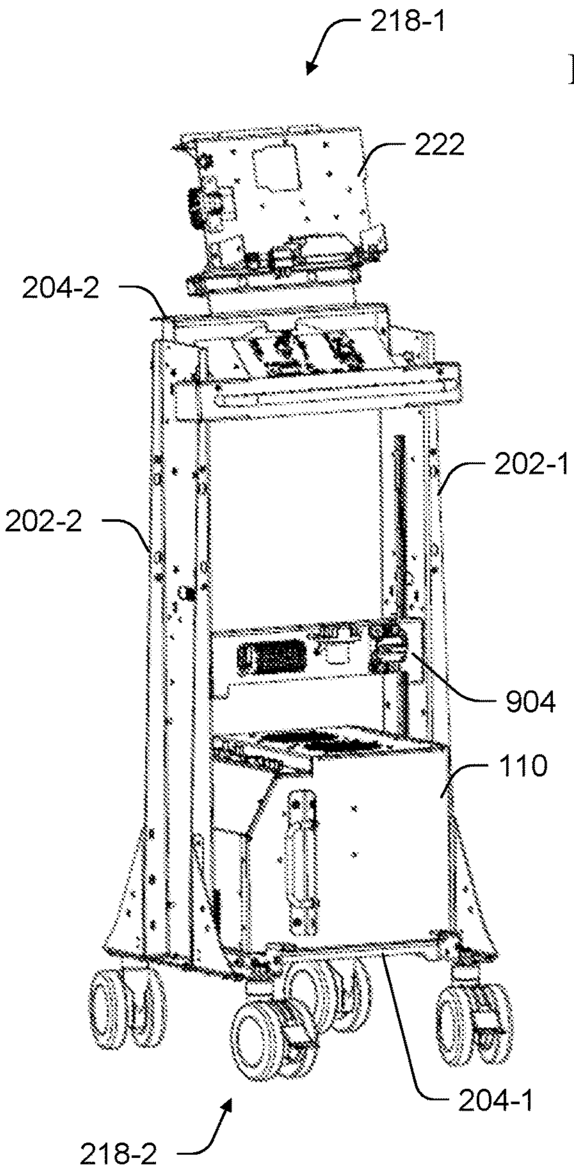
FIG. 19 is a rear oblique view of the mobile robot of FIG. 1 including an exemplary port panel, according to an embodiment of the present application.
Figure 20:
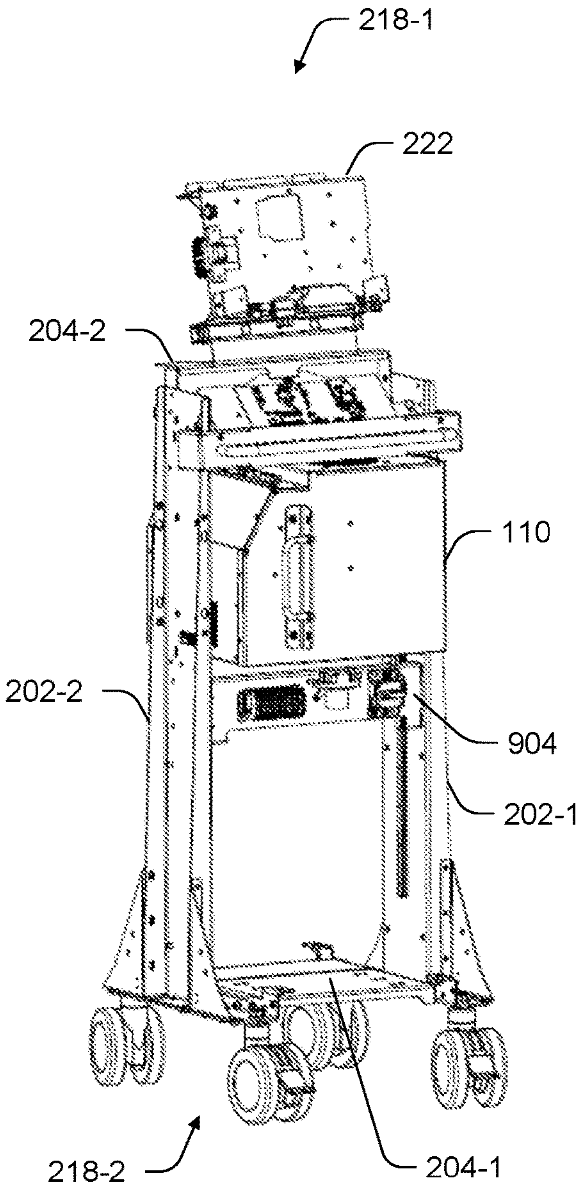
FIG. 20 is a rear oblique view of the mobile robot of FIG. 16 including the port panel of FIG. 19, according to an embodiment of the present application.

In another embodiment, the mobile robot 100 may further include a distinct port panel 904 mounted thereto. In some examples, the port panel 904 may be similar to the port plate 808. The port panel 904 may be mounted in combination with the modular box 110. For example, as illustrated in FIG. 19, the chassis 104 may include the port panel 904 mounted thereto. The port panel 904 may be secured to the support columns 202. The port panel 904 may include various power components to facilitate communication of electrical and control signals between the modular box 110 and the remote components such as those mentioned above. Examples of the power components may include, but are not limited to, a terminal block, a voltage or current regulator, and a circuit breaker. In some examples, the port panel 904 may also include an electrical port such as a power port configurable to connect with a wall outlet via a power cord or a battery, such as a battery 908 shown in FIGS. 21-22, mounted on the chassis 104; however, other examples may include the power port being mounted in a channel, such as the channel 214, of one of the support columns 202. The port panel 904 may be mounted at any suitable position along a length of the support columns 202 or the chassis 104. The port panel 904 may be positioned in the mobile robot 100 relative to the modular box 110. For example, as illustrated in FIG. 19, when the modular box 110 may be located in the lower section 218-2 of the chassis 104, the port panel 904 may be mounted above the modular box 110. In another example, as illustrated in FIG. 20, when the modular box 110 may be located in the upper section 218-1 of the chassis 104, the port panel 904 may be mounted above the modular box 110. Other instances may include the port panel 904 located adjacent to the modular box 110 at any other position between the robot platforms 204 (or the robot portions 108) along a longitudinal axis of the chassis 104.

The port panel 904, or components thereof, may be mounted or oriented towards a rear side of the mobile robot 100; however, other locations on the chassis 104 or the mobile robot 100 may also be contemplated. For example, the chassis 104 may include a first port panel (similar to the port panel 904) including a first port (not shown) and a second port panel (not shown) including a second port (not shown). Each of the first port and the second port (collectively referred to as side ports), or the respective port panels, may be mounted in a channel, such as the channel 214, of the same or different support columns 202. The first port (or the first port panel) may be located in the lower section 218-2 of the chassis 104 and the upper port (or the second port panel) may be located in the upper section 218-1 of the chassis 104. The side ports (or the respective port panels) may be set up in electrical communication with the modular box 110. For example, the lower port may interface between the power port and the ports 810, or the underlying port plate 808, on the modular box 110 located in the lower section 218-2 of the chassis 104. Similarly, in another example, the upper port may interface between the power port and the ports 810, or the underlying port plate 808, on the modular box 110 located in the upper section 218-1 of the chassis 104. The side ports and/or the respective port panels may assist in deploying the modular box 110 as a plug-and-play unit and providing an electrical path for powering and/or controlling the remote components, such as the load unit 106, of the mobile robot 100.

Figure 21:
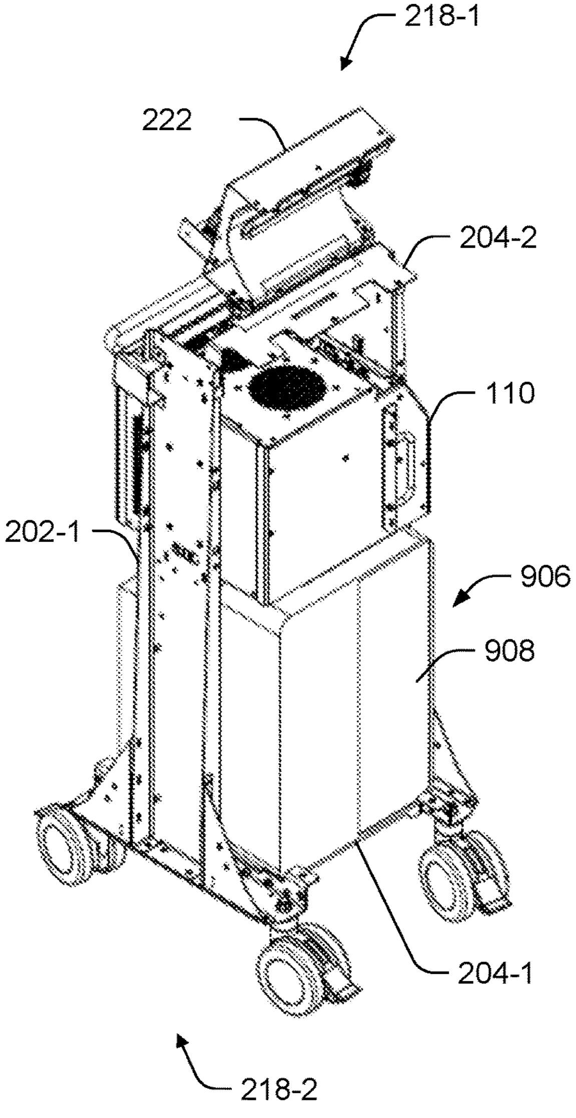
FIG. 21 is a front left perspective view of the mobile robot of FIG. 16 including an exemplary utility compartment, according to an embodiment of the present application.
Figure 22:
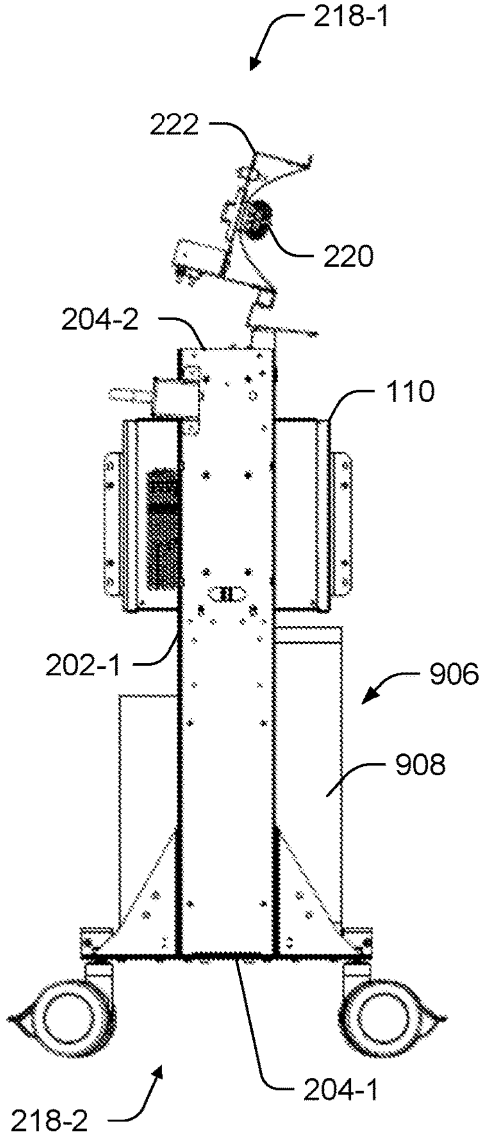
FIG. 22 is a left elevation view of the mobile robot of FIG. 21, according to an embodiment of the present application.

In a further embodiment, the mobile robot 100 may include a distinct utility compartment 906 in combination with the modular box 110. For example, as illustrated in FIG. 21 and FIG. 22, the chassis 104 may include the utility compartment 906 mounted thereto. The utility compartment 906 may be mounted under the modular box 110. The utility compartment 906 may be mounted within the exterior planes of the mobile robot 100. For instance, the utility compartment 906 may be removably secured to the base platform 204-1 in the lower section 218-2 and the modular box 110 may be removably (and movably) secured in the upper section 218-1 of the chassis 104. The utility compartment 906 may include the battery 908 or any other suitable supporting components of the mobile robot 100. Examples of the supporting components may include, but are not limited to, a voltage inverter, a current inverter, and a control device. In some examples, the utility compartment 906 may further include a storage compartment, a germicidal source, a handheld or portable apparatus, a floor cleaning unit, or any combinations thereof.

During operation, in one example, the modular box 110 may be disposed in the lower section 218-2 of the chassis 104. In the lower section 218-2, the modular box 110 may assist in navigational stability of the mobile robot 100 by counterbalancing a shift in COM or COG of the mobile robot 100, e.g., due to a weight of the load unit 106 or components supported therewith. The modular box 110 may be disposed in the closed configuration. The modular box 110 may include the side panels including the lateral panels 402-5 in the closed position. The modular box 110 may be located within the exterior planes of the mobile robot 100 in the closed configuration. For maintenance (or deployment in some examples), the mobile robot 100 and/or the modular box 110 may be operated locally or remotely. The modular box 110 may be manipulated in the lower section 218-2 to transition from the closed configuration to the open configuration for accessing or deploying the operational components mounted therein. Alternatively, the modular box 110 may be moved along the guide rails 216 from the lower section 218-2 to the upper section 218-1 prior to the modular box 110 being manipulated to the open configuration. Upon manipulated, the lateral panels 402-5 may pivot about the pivoting axes, e.g., via hinges such as the hinge 814, to transition from the closed position to the open position. The lateral panels 402-5 may pivot to become non-parallel to the vertical axis of the mobile robot 100 or that of modular box 110 during transition to the open position.

In the open position, the lateral panels 402-5 may extend out laterally from the modular box 110 and beyond the exterior planes of the mobile robot 100 (and the chassis 104). The lateral panels 402-5 may become parallel to the horizontal axis of the mobile robot 100 or that of modular box 110 in the open configuration; however, some examples may include the lateral panels 402-5 being pivoting to the maximum pivot angle of greater than approximately 90 degrees with respect to the vertical axis of the modular box 110 or that of the mobile robot 100. The open position of the lateral panels 402-5 may correspond to the open configuration of the modular box 110. In the open configuration, the modular box 110 may provide access to the interior portion thereof and/or the operational components mounted thereto for maintenance or deployment. Since the top panel 402-1 is mounted independent of the lateral panels 402-5, manipulating the lateral panels 402-5 from the closed position to the open position does not need or cause the top panel 402-1 to be removed for accessing the operational components on the inner surfaces 902 and/or the interior portion of the modular box 110. Such independent manipulation of the lateral panels 402-5 allows for convenient component maintenance and/or deployment In scenarios where a replacement for any of the operational components is unavailable or a significant delay in maintenance or deployment is expected due to the underlying box panel requiring a comprehensive testing, the existing modular box 110 or the individual box panel may be removed and replaced with a new similar one, thereby minimizing downtime of the mobile robot 100. Moreover, merely replacing the modular box 110 or any of the individual box panels (e.g., any of the lateral panels 402-5 and the bottom panel 402-2) abates the need to transport the whole mobile robot 100 to a service center for testing or maintenance, thereby assisting to reduce the robot downtime as well as the related transportation, maintenance, and operational costs.

With regard to materials of construction, any material(s) of sufficient rigidity, mechanical resistance, and germicide resistance (e.g., resistance to various other cleaning and disinfection agents) may be used to construct the robot platforms 204, the support columns 202, the load unit 106, and the autonomous vehicle 226. The same materials may be used to make one or more cabinets or casings for the mobile robot 100.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiments, methods, and examples, but by all embodiments and methods within the concepts described in the present application.

I claim:

1. A robot, comprising:

a chassis; and a housing mounted to the chassis, the housing including a panel configured to mount a component thereto, wherein the panel is configured to pivot about a pivoting axis perpendicular to a horizontal axis of the housing and a vertical axis of the housing, thereby controlling access to an interior of the housing, wherein the housing is mounted between a first platform and a second platform mounted to the chassis.

2. The robot as claimed in claim 1, further comprising a port plate including one or more electrical ports, wherein the port plate is mounted to the housing.

3. The robot as claimed in claim 1, further comprising a port panel including an electrical port, wherein the port panel is mounted to the chassis.

4. The robot as claimed in claim 1, further comprising a load unit including at least one of a UV source, a sensor, a portable apparatus, a robotic arm, and a storage compartment.

5. The robot as claimed in claim 4, wherein the component is configured to drive the load unit.

6. The robot as claimed in claim 1, wherein the panel is further configured to extend beyond exterior planes including exterior surfaces of the chassis with the housing located within the exterior planes of the chassis, and wherein the panel pivots to extend beyond a vertical plane including an exterior surface of the robot.

7. The robot as claimed in claim 1, wherein the housing is configured to move along a longitudinal axis of the chassis.

8. The robot as claimed in claim 1, wherein the housing is configured to move between a first section of the chassis and a second section of the chassis, wherein the second section includes a wheel.

9. The robot as claimed in claim 1, wherein the second platform is mounted over the first platform.

10. The robot as claimed in claim 1, further comprising a utility compartment mounted to the chassis, wherein the utility compartment includes at least one of a battery, storage compartment, a germicidal source, a portable apparatus, and a floor cleaning unit.

11. The robot as claimed in claim 1, further comprising an autonomous vehicle mounted to the chassis, wherein the autonomous vehicle is configured to move the chassis autonomously.

12. The robot as claimed in claim 1, wherein the panel is configured to move between a closed position and an open position, wherein the panel is parallel to the vertical axis in the closed position and non-parallel to the vertical axis in the open position.

13. The robot as claimed in claim 1, wherein the panel is configured to pivot to an angle ranging from 0 degree to 90 degrees with respect to the vertical axis.

14. The robot as claimed in claim 1, further comprising a secondary panel configured to pivot about a set axis parallel to the pivoting axis.

15. The robot as claimed in claim 14, wherein the secondary panel is opposite to the panel.

16. A chassis for a robot, the chassis comprising:

a set of wheels; and a housing including a plurality of panels configured for mounting a component thereto, the plurality of panels including a panel pivotably mounted to the housing, wherein the panel is configured to pivot about a pivoting axis perpendicular to a horizontal axis of the housing and a vertical axis of the housing, thereby controlling access to an interior of the housing, wherein the housing is mounted between a first platform and a second platform mounted to the chassis.

17. The chassis as claimed in claim 16, further comprising a port plate including one or more electrical ports, wherein the port plate is mounted on the housing.

18. The chassis as claimed in claim 16, wherein the panel is configured to move between a closed position and an open position, wherein the panel is parallel to the vertical axis in the closed position and non-parallel to the vertical axis in the open position.

19. The chassis as claimed in claim 16, further comprising a secondary panel configured to pivot about a set axis parallel to the pivoting axis, wherein the secondary panel is opposite to the panel.

* * * * *